United States Patent
Khalid et al.

(10) Patent No.: US 11,838,992 B2
(45) Date of Patent: *Dec. 5, 2023

(54) SYSTEMS AND METHODS FOR A CONNECTED SUMP PUMP

(71) Applicant: Pentair Flow Technologies, LLC, Delavan, WI (US)

(72) Inventors: Hassan Khalid, Greenfield, WI (US); Nicola Sgambelluri, Pisa (IT); Brian Broga, Elkhorn, WI (US); Brian Boothe, Raleigh, NC (US); Dan Featherstone, Walworth, WI (US)

(73) Assignee: PENTAIR FLOW TECHNOLOGIES, LLC, Delavan, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,718

(22) Filed: Aug. 23, 2022

(65) Prior Publication Data
US 2022/0418040 A1    Dec. 29, 2022

Related U.S. Application Data

(63) Continuation of application No. 16/666,260, filed on Oct. 28, 2019, now Pat. No. 11,425,786.

(Continued)

(51) Int. Cl.
*H04W 84/18*    (2009.01)
*H04W 76/15*    (2018.01)
(Continued)

(52) U.S. Cl.
CPC .......... *H04W 84/18* (2013.01); *F04B 23/023* (2013.01); *G06F 1/3209* (2013.01); *G07C 3/02* (2013.01); *H04W 4/80* (2018.02); *H04W 76/15* (2018.02)

(58) Field of Classification Search
CPC ....... H04W 84/18; H04W 76/15; H04W 4/80; F04B 23/23; G06F 1/3209; G07C 3/02
(Continued)

(56) References Cited

U.S. PATENT DOCUMENTS 2,687,693 A    8/1954    Hudson
4,187,503 A    2/1980    Walton
(Continued)

FOREIGN PATENT DOCUMENTS

EP    1450328 A2    8/2004

OTHER PUBLICATIONS

Extended European Search Report, EP Application No. 19205740.4, dated Jul. 15, 2020, 9 pages.

(Continued)

*Primary Examiner* — David Bilodeau
(74) *Attorney, Agent, or Firm* — Husch Blackwell LLP

(57) ABSTRACT

Systems and methods for monitoring operation of a sump pump are provided. A method includes connecting a power adapter to the sump pump and a float-switch. The power adapter includes a controller positioned within a housing, prongs in communication with components coupled to the controller, a first receptacle and a second receptacle. The controller is configured to establish a wireless connection to a first wireless network, and transmit a message to a remote server over the first wireless network. The controller is further configured to determine a power status of a float switch and control the pump based on power status of the float switch.

20 Claims, 24 Drawing Sheets

Related U.S. Application Data

(60) Provisional application No. 62/753,560, filed on Oct. 31, 2018.

(51) Int. Cl.
*H04W 4/80* (2018.01)
*F04B 23/02* (2006.01)
*G06F 1/3209* (2019.01)
*G07C 3/02* (2006.01)

(58) Field of Classification Search
USPC .......................................................... 417/18
See application file for complete search history.

(56) References Cited

U.S. PATENT DOCUMENTS

| | | |
|---|---|---|
| 4,222,711 A | 9/1980 | Mayer |
| 4,255,747 A | 3/1981 | Bunia |
| 4,369,438 A | 1/1983 | Wilhelmi |
| 4,456,432 A | 6/1984 | Mannino |
| 4,595,894 A | 6/1986 | Doyle et al. |
| 5,015,151 A | 5/1991 | Snyder, Jr. et al. |
| 5,324,170 A | 6/1994 | Anastos et al. |
| 5,672,050 A | 9/1997 | Webber et al. |
| 6,375,430 B1 | 4/2002 | Eckert et al. |
| 6,676,382 B2 | 1/2004 | Leighton et al. |
| 7,307,538 B2 | 12/2007 | Kochan, Jr. |
| 7,309,216 B1 | 12/2007 | Spadola, Jr. et al. |
| 7,429,842 B2 | 9/2008 | Schulman et al. |
| 7,458,782 B1 | 12/2008 | Spadola, Jr. et al. |
| 8,047,805 B2 | 11/2011 | Bourell, Jr. et al. |
| 8,297,937 B2 | 10/2012 | Johnson |
| 8,380,355 B2 | 2/2013 | Mayleben et al. |
| 8,500,412 B2 | 8/2013 | Williams et al. |
| 8,579,600 B2 | 11/2013 | Vijayakumar |
| 8,641,384 B2 | 2/2014 | Bourell, Jr. et al. |
| 8,807,957 B2 | 8/2014 | Hampton |
| 8,892,263 B1 | 11/2014 | Morris et al. |
| 8,907,789 B2 | 12/2014 | Kochan et al. |
| 9,157,434 B2 | 10/2015 | Leonard et al. |
| 9,441,625 B2 | 9/2016 | Schoendorff |
| 9,441,632 B2 | 9/2016 | Bishop et al. |
| 9,500,193 B2 | 11/2016 | Knight et al. |
| 9,500,194 B2 | 11/2016 | Knight et al. |
| 9,523,366 B2 | 12/2016 | Cummings et al. |
| 9,525,309 B2 | 12/2016 | Cummings |
| 9,528,512 B2 | 12/2016 | Cummings |
| 9,528,522 B2 | 12/2016 | Cummings |
| 9,528,873 B2 | 12/2016 | Cummings |
| 9,534,593 B2 | 1/2017 | Cummings et al. |
| 9,534,606 B2 | 1/2017 | Cummings |
| 9,638,193 B2 | 5/2017 | Bishop et al. |
| 9,696,360 B2 | 7/2017 | Rothbart |
| 9,709,054 B2 | 7/2017 | Cummings |
| 9,752,569 B1 | 9/2017 | Morris et al. |
| 9,920,766 B2 | 3/2018 | Bishop et al. |
| 9,927,479 B2 | 3/2018 | Rothbart |
| 10,208,747 B2 | 2/2019 | Cummings |
| 10,323,647 B2 | 6/2019 | Grezeika |
| 10,364,816 B2 | 7/2019 | Nofal et al. |
| 10,378,336 B2 | 8/2019 | Marvel et al. |
| 11,035,367 B1 | 6/2021 | Hansen et al. |
| 11,041,908 B2 | 6/2021 | Rothbart |
| 11,174,857 B1 | 11/2021 | Kowalski et al. |
| 2006/0008355 A1 | 1/2006 | Low |
| 2006/0078435 A1 | 4/2006 | Burza |
| 2006/0176000 A1* | 8/2006 | Schulman ........... F04D 15/0218 318/482 |
| 2007/0258827 A1 | 11/2007 | Gierke |
| 2008/0024942 A1 | 1/2008 | Gallas et al. |
| 2008/0031751 A1 | 2/2008 | Littwin et al. |
| 2008/0031752 A1 | 2/2008 | Littwin et al. |
| 2008/0094763 A1* | 4/2008 | Tharp ................... H02H 9/047 361/31 |
| 2008/0298978 A1 | 12/2008 | Schulman et al. |
| 2011/0077875 A1 | 3/2011 | Tran et al. |
| 2011/0273288 A1* | 11/2011 | Kochan, Jr. .............. G05D 9/12 73/700 |
| 2011/0286859 A1 | 11/2011 | Ortiz et al. |
| 2011/0311370 A1 | 12/2011 | Sloss et al. |
| 2013/0197700 A1* | 8/2013 | Kochan, Jr. ........... F04B 49/065 700/282 |
| 2013/0294931 A1 | 11/2013 | Magnusson et al. |
| 2015/0292501 A1 | 10/2015 | Knight et al. |
| 2016/0284496 A1* | 9/2016 | Afshar ................. F04D 15/0218 |
| 2016/0333884 A1 | 11/2016 | Hussain et al. |
| 2017/0122094 A1 | 5/2017 | Chugunov et al. |
| 2017/0145666 A1 | 5/2017 | Kochan, Jr. |
| 2017/0170979 A1* | 6/2017 | Khalid ................ H04L 12/2818 |
| 2017/0175746 A1* | 6/2017 | Mayleben ............ F04D 13/086 |
| 2017/0218943 A1 | 8/2017 | Ellis et al. |
| 2017/0370369 A1 | 12/2017 | Grzeika |
| 2018/0017459 A1* | 1/2018 | Banta ........................ F04F 1/20 |
| 2018/0156211 A1 | 6/2018 | Bishop et al. |
| 2018/0163730 A1 | 6/2018 | Wilds et al. |
| 2018/0196097 A1 | 7/2018 | Rothbart |
| 2018/0209426 A1 | 7/2018 | Bishop et al. |
| 2019/0101427 A1 | 4/2019 | Beger et al. |
| 2019/0353156 A1 | 11/2019 | Ward et al. |
| 2020/0137830 A1 | 4/2020 | Khalid et al. |
| 2022/0025880 A1 | 1/2022 | Pryor et al. |
| 2022/0128049 A1 | 4/2022 | Van Stell et al. |
| 2022/0136499 A1 | 5/2022 | Deem et al. |

OTHER PUBLICATIONS

Catalog, Motor Protection Electronics Inc., Jan. 2016, 102 pages.
Sump Pump Smart Outlet, Pump Spy, 2016, 2 pages.

* cited by examiner

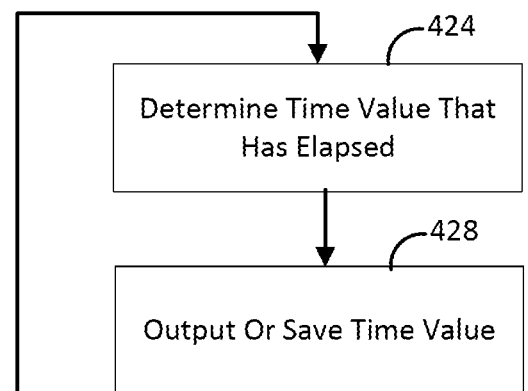
FIG. 20
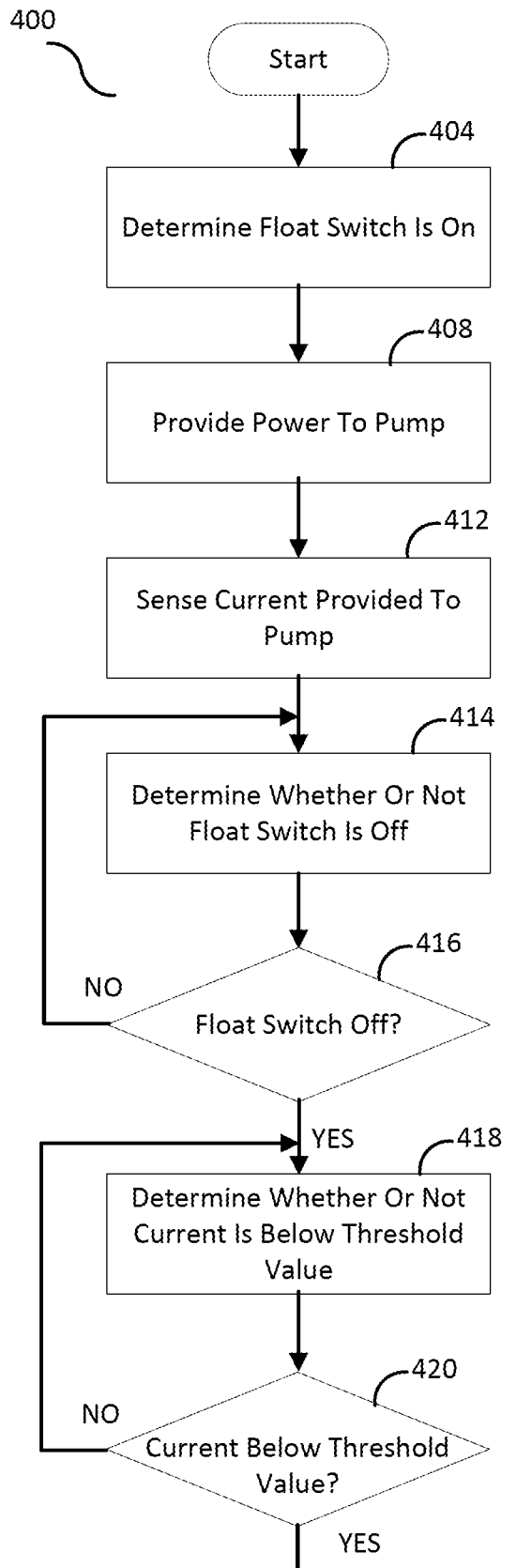

SYSTEMS AND METHODS FOR A CONNECTED SUMP PUMP

RELATED APPLICATIONS

This application is a continuation of U.S. patent application Ser. No. 16/666,260 filed Oct. 28, 2019, which claims priority to, U.S. Provisional Application No. 62/753,560, filed Oct. 31, 2018, all of the disclosures of which are incorporated by reference herein in their entirety.

BACKGROUND

Float switches are commonly used to automatically turn a sump pump on when water rises to a preset level. The float switches for sump pumps can have normally open relays, allowing the pump to be inactive when the float is in the lowered position, and to activate when the float is raised. Various types of float switches can be used with a sump pump, such as: vertical float switches, tethered float switches, and electronic float switches. Alternatively, in some situations, pressure switches can be used to control the sump pump.

Vertical float switches slide up and down on a rod. As fluid enters the basin, the float rises to trigger a switch that turns the pump on. Once the pump has lowered the fluid level to a certain point, the float triggers the switch to turn the pump off.

A tethered float is attached to a bent rod, mechanical trigger, or a cable. Similar to the vertical float, a tethered float triggers the pump to turn on and off based on the rise and fall of the fluid level.

Electronic float switches are primarily used in sump pits which are too narrow to accommodate a tethered float or other float type. Electronic float switches have no moving parts and switch on and off when the switch detects a rise or fall in the water level.

Float switches can be installed via a piggy-back plug. In such an installation, the power plug on the float switch can plug-in to a power outlet, and the pump power plug can plug into the piggy-back outlet on the back of the float power plug.

Sump basins and sump pumps require regular maintenance. However, the frequency that the pump is used can dictate when maintenance is needed. Some pumps can run frequently due to higher water table, water drainage, or weather conditions. Sump pumps, being mechanical devices, can eventually wear out and/or require replacement. Early recognition of problems and subsequent correction can prevent an accidental shutdown of a sump pump. Some sump pumps can alert homeowners to maintenance issues via indicator lights and/or alarms. By nature, however, sump pumps are generally located in low-traffic areas (e.g., a corner of a basement). As such, indicator lights and alarms can go unnoticed if a homeowner does not actively check on the sump pump.

SUMMARY

In accordance with some embodiments of the invention, systems and methods for monitoring operation of a sump pump are provided. The systems and methods of the invention overcome drawbacks of existing systems, including those described above, to provide individuals with the ability to monitor and control a sump pump, and in particular, to overcome the shortcomings relating to the health of the sump pump and the notification of individuals when a problem occurs.

In accordance with some embodiments of the invention, a system for monitoring operation of a sump pump via a remote server is provided. The system includes a power adapter comprising a housing, a controller within the housing, the controller establishing a connection with the remote server via a first wireless network. The power adapter includes prongs extending away from the housing and in electrical communication with components coupled to the controller. The prongs are configured to receive electric power from electric power inputs. The power adapter further includes a first receptacle positioned on the housing and configured to accept a float-switch input to the controller and the electric power inputs. Additionally, the power adapter includes a second receptacle positioned on the housing and configured to accept a sump pump input of the sump pump and electrically connect the sump pump input to the controller and the electric power inputs.

In some embodiments, the controller is further configured to execute computer-readable instructions to: determine a power status of a float switch electrically coupled to the power adapter at the first receptacle, provide power to the sump pump, sense a current provided to the sump pump, determine a time value that has elapsed, and control the pump based on comparing the current and the time value.

In some further embodiment, the power status of the float switch is either a float switch on configuration or a float switch off configuration.

In some embodiments, the controller operates a pump based on the time value using a method comprising: determining that the float switch is on, providing power to the sump pump, determining that the float switch is off, continuing to provide power to the sump pump for an amount of time equal to the time value that has passed since the determining that the float switch is off, and ceasing to provide power to the sump pump.

In some embodiments, the housing comprises a mounting hole oriented to accept a screw for insertion into a duplex wall outlet to affix the power adapter to the simplex outlet.

In some further embodiments, the system includes a tab extension. The tab extension is configured to be inserted into the mounting hole. The system further comprises a second mounting hole. The second mounting hold is configured to accept the screw for insertion into a simplex wall outlet to affix the power adapter to the simplex outlet.

In some embodiments, the power adapter further includes a secondary float switch. The secondary float switch can be coupled to high water switch terminals. The high water switch terminals can detect when a water level reaches a predetermined height and indicate a potential flood condition.

In some embodiments, the second receptacle is provided in a form of a switch receptacle having three terminals.

In some embodiments the housing includes an input device. In some embodiments, activation of the input device is designed to initiate a factory reset process, a manual pump operation process, a local mode of the power adapter, or clear a fault.

In some embodiments, the controller performs a health test. The health test includes the steps: running the sump pump for a predetermined time period, receiving operational data from the power adapter, generating a health test report based on the operational data, and outputting the health test report to a user device.

In some embodiments, the power adapter further includes an indicator system. In some embodiments, the indicator system is provided in a form of a first indicator and a second indicator that can be configured to change based on the operating conditions of the system. In some embodiments, the first indicator is positioned between the first receptacle and the second receptacle. In some embodiments the second indicator is positioned on a top surface of the housing.

In some further embodiments, the indicator system is illuminated in a solid red configuration during a locked rotor state, a dry run state, a relay event, and a high water state. In some embodiments, the indicator system is illuminated in a solid yellow configuration during an over current state, or an excessive run time state. The indicator system can be illuminated in an event where the sump pump is stopped, including a current sensor event, a float switch event, and an offline event.

In accordance with some embodiments of the invention, a system for monitoring operation of a float-switch controlled sump pump via a remote server is provided. The system includes a power adapter. The power adapter includes a housing and a controller. The controller establishes a first wireless connection to a first wireless network and transmits a message to the remote server over the first wireless network. The power adapter further includes prongs extending away from the housing. The prongs are in electrical communication with components coupled to the controller. The prongs are configured to receive electric power from electric power inputs. The power adapter includes a first receptacle and a second receptacle. The first receptacle is configured to accept a float-switch input. The float switch input is in electrical communication with a printed circuit board upon insertion into the first receptacle. The second receptacle is configured to accept a sump pump input. The sump pump input is in electrical communication with the printed circuit board upon insertion into the second receptacle.

In some embodiments, the controller is further configured to: determine that the float switch is on, provide power to the sump pump, determine that the float switch is off, continue to provide power to the sump pump for an amount of time equal to a predetermined time value that has passed since the determining that the float switch is off, and cease to provide power to the sump pump.

In some embodiments, the power adapter communicates directly with a user device over a Bluetooth or a WiFi connection.

In some embodiments, the message comprises at least one of: an average weekly motor current, an average motor current per cycle, a longest cycle length, a shortest cycle length, a total number of cycles, a total pump run time, an average power per week, an average power per cycle, a power factor, a number of cycles between a previous health test, a time of one or more health tests, and a voltage measured by the power adapter.

DESCRIPTION OF THE DRAWINGS

The invention will be better understood and features, aspects and advantages other than those set forth above will become apparent when consideration is given to the following detailed description thereof. Such detailed description makes reference to the following drawings.

FIG. 20 is an exemplary process for determining a time value for running a sump pump after a float switch has been turned off in order to reduce a number of motor starts for the pump.

DETAILED DESCRIPTION

Figure 1:
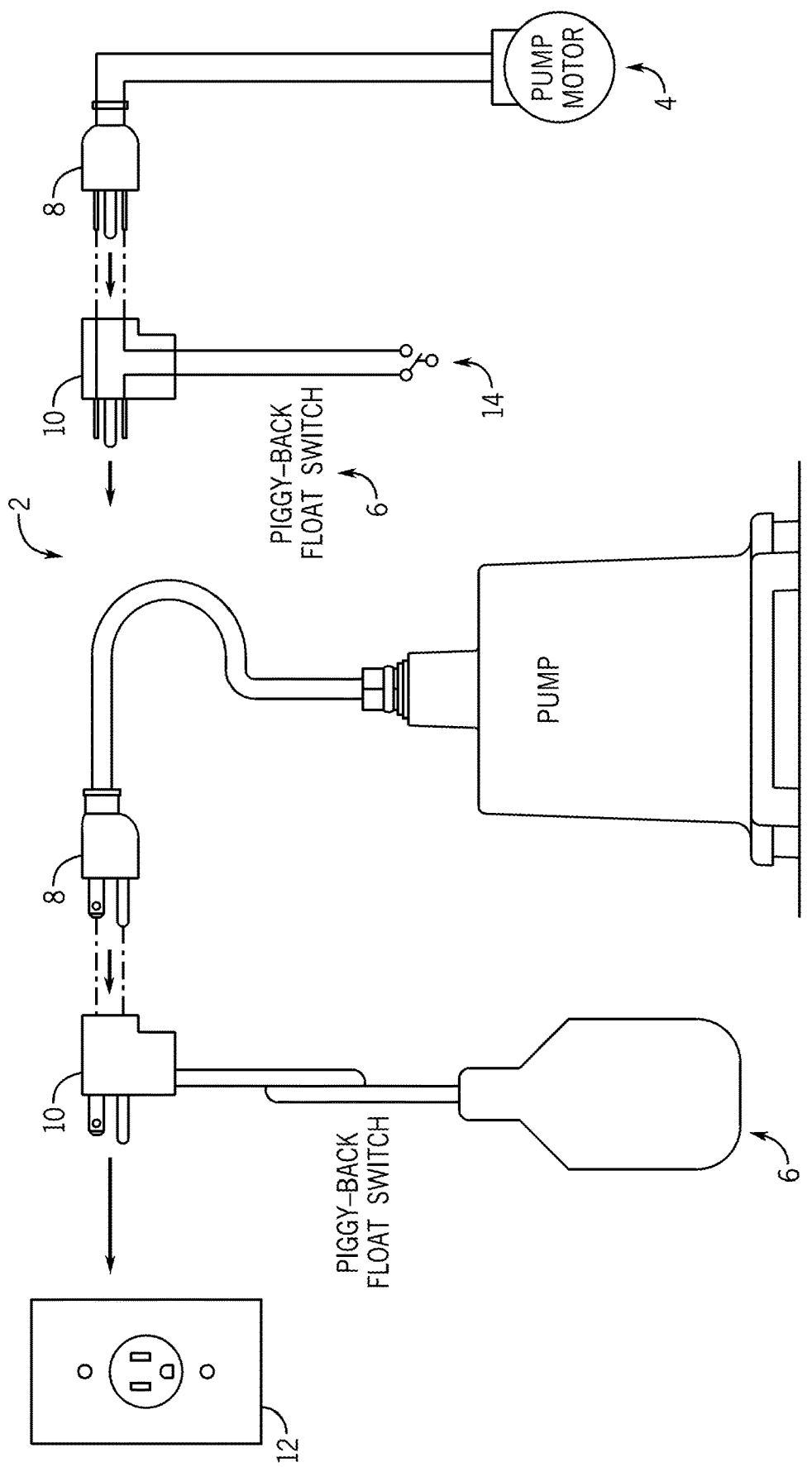
FIG. 1 is an example of a conventional process for installing a piggy-back float switch with a sump pump.

Before any embodiments are described in detail, it is to be understood that the invention is not limited in its application to the details of construction and the arrangement of components set forth in the following description or illustrated in the following drawings, which is limited only by the claims that follow the invention. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

The invention includes systems and methods for "smart" sump pump control and monitoring. Specifically, the invention provides a connected sump pump control that is configured to send and receive data to remote devices. This allows a homeowner to, for example, receive alerts on their smartphone corresponding to a sump pump fault/problem. Further, a homeowner can access sump pump data and remotely control the pump (e.g., turn the sump pump on and off, clear system faults, etc.). Through the implementation of a power adapter, homeowners can convert an existing sump pump/float switch system into a "smart" sump pump system.

The power adapter can transmit data corresponding to the sump pump and the float switch to a server (e.g., a cloud-based server). Accordingly, the system can monitor operating parameters such as power consumption, run time, and cycle count. From information such as cycle count, the system can determine and inform the homeowner of the predicted life of the sump pump. From information such as power consumption, the system can inform the homeowner of abnormal sump pump behavior.

In some embodiments, a "health test" can be conducted on the sump pump system. The results of the test can be provided to the homeowner (e.g., via a smartphone). The health test can be performed on an automated schedule, and/or when the homeowner requests a new health test. In some embodiments, the disclosed power adapter can measure operational values such as, but not limited to: instantaneous motor current, peak motor current, cycle time, number of cycles, pump run time, power factor, and/or voltage. From these values, analytics can provide values such as, but not limited to: average weekly motor current, average motor current per cycle, longest cycle length, shortest cycle length, total number of cycles, total pump run time, average power per week, and/or average power per cycle. In some embodiments, a user/homeowner can provide inputs via an internet enabled device (e.g., their smartphone), such as but not limited to: clear fault, default settings, dry run delay time, dry run detection time, dry run enable/disable, excessive run time limit, fault readings, pump control method, pump start/stop, motor service factor amps, pump status, and power.

FIG. 1 shows an example of a conventional system 2 for installing a piggy-back float switch 6 with a sump pump 4. As shown, the piggy-back float switch 6 includes a power plug 10, which can be inserted into a standard power outlet 12. Additionally, the sump pump 4 includes a power plug 8, which can be inserted into a side of the power plug 10. Accordingly, the sump pump 4 "piggy-backs" off of the piggy-back float switch 6. In this way, the piggy-back float switch 6 can control the operation of the sump pump 4, from a single power source. As further detailed by FIG. 1, a conventional piggy-back float switch 6 can include a normally open ("NO") relay 14. This enables the pump motor (sump pump 4) to turn on (NO relay 14 closes), when the physical float reaches a threshold level, indicative of a high water level. Similarly, the pump motor can turn off (NO relay 14 opens), when the physical float reaches a threshold level, indicative of a low water level (such as when no water is present). This operation is described below in further detail, with respect to FIG. 2.

Figure 2:
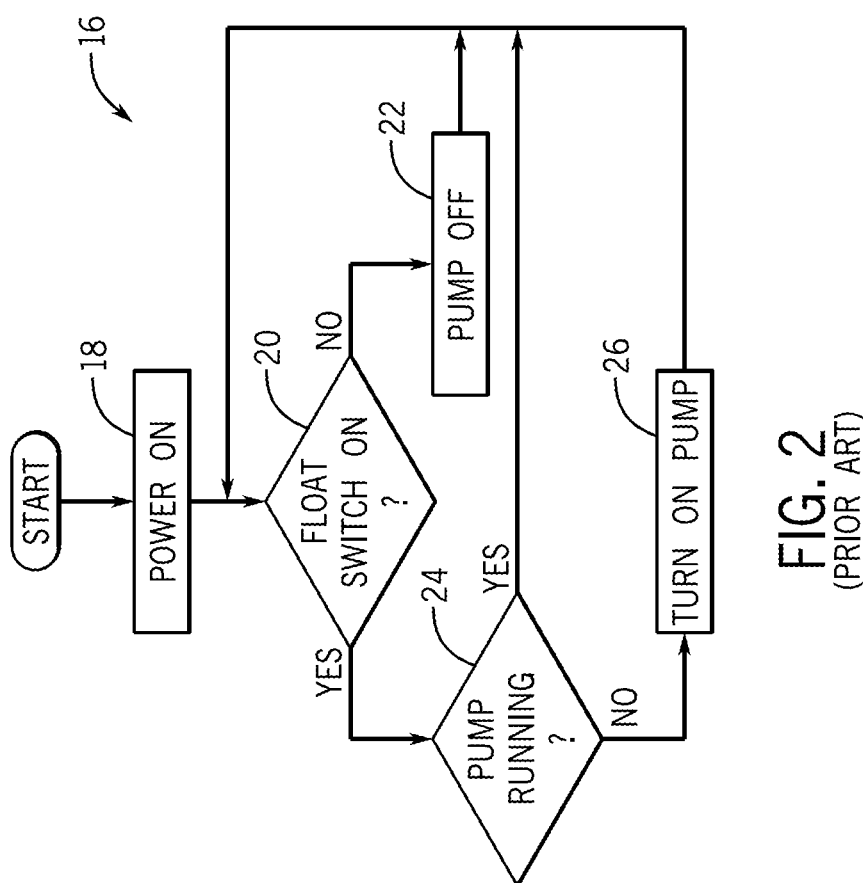
FIG. 2 is an example of a conventional process for operating a sump pump using a float switch.

FIG. 2 shows an example of a conventional process 16 for operating a sump pump using a float switch. As shown, process 16 includes providing power (power on) at process block 18. Next, if the float switch is on (i.e., the result of decision block 20 is "Yes"), it is determined if the pump is running (decision block 24). If the pump is not running (i.e., the result of decision block 24 is "No"), then the pump is turned on (process block 26). The process of checking the float switch status at decision block 20 is then repeated. Alternatively, if the float switch is off (i.e., the result of decision block 20 is "No"), then the pump is turned off (process block 22), and the process of checking the float switch status at decision block 20 is then repeated.

Figure 3:
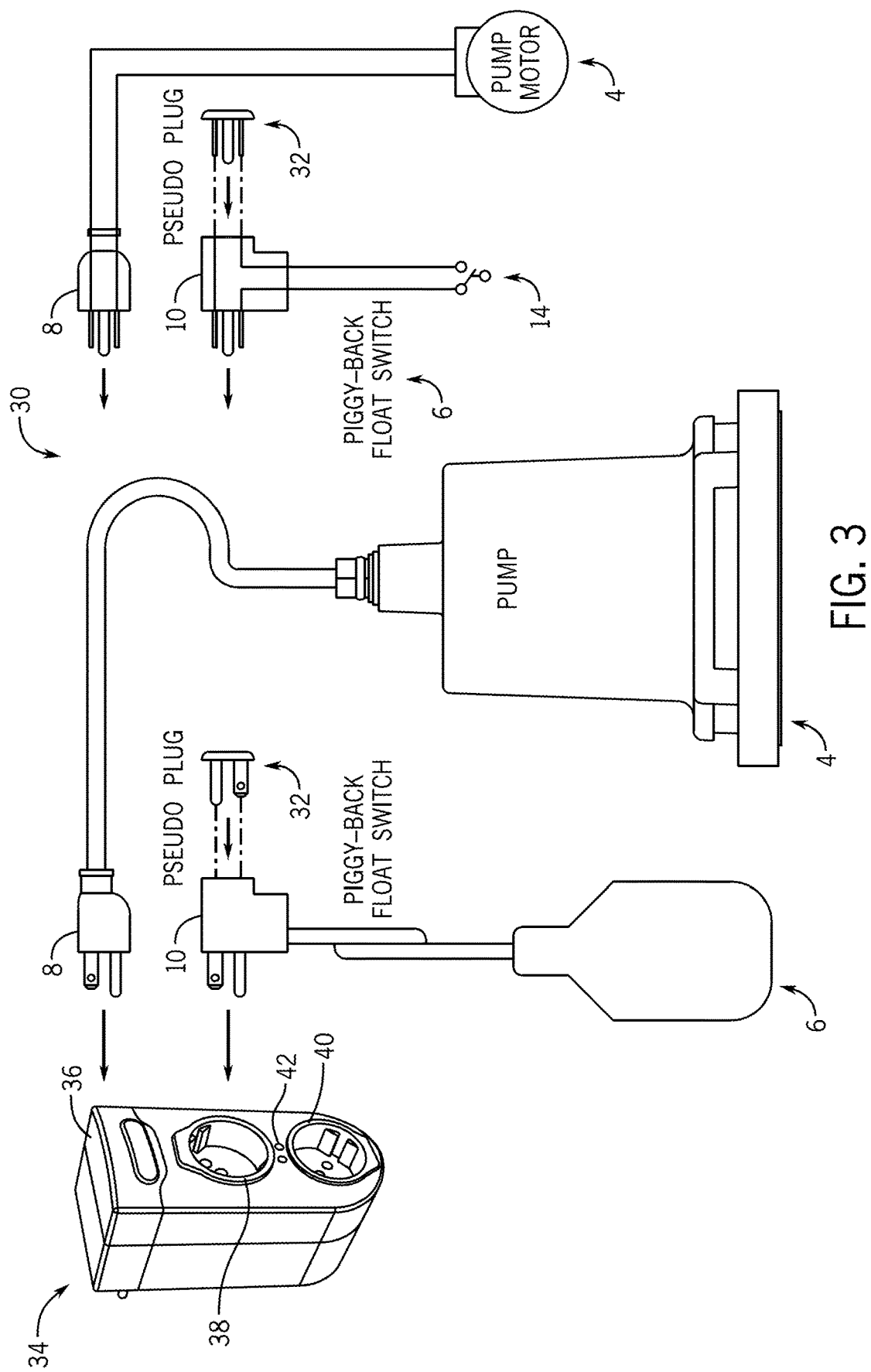
FIG. 3 is a process diagram for installing a piggy-back float switch with a sump pump, in accordance with some embodiments of the invention.

FIG. 3 is a system 30 for installing a piggy-back float switch with a sump pump, in accordance with some embodiments of the invention. The invention includes a sump pump power adapter (power adapter 34) that can be configured to communicate between the piggy-back float switch 6 and the sump pump 4, thus facilitating operational control of the sump pump 4. Further, the power adapter 34 can be used to gather operational data from the piggy-back float switch 6 and/or the sump pump 4. In some embodiments, the power adapter 34 can send and receive information to/from remote devices, such as a smartphone or computer.

As shown, the power adapter 34 can include a pump receptacle 38, as well as a float switch receptacle 40. A housing 36 can be configured to support and contain a printed circuit board (PCB). In some embodiments, the PCB can be electrically coupled to an integrated chip. Note that although the power adapter 34 is described as including the integrated chip, this is merely an example, and any suitable type of hardware processor or combination of hardware processors can be used to monitor and/or control the sump pump 4 and the float switch 6.

In some embodiments, the housing 36 can include an indicator 42 (e.g., an LED indicator). In some embodiments, the power adapter 34 can have multiple indicators, which can be configured to change based on operating conditions. Further, in some embodiments, the housing 36 can include a manual input device (e.g., a push button, a selector switch, a recessed button, etc), which can be configured to initiate a factory reset process, a manual pump operation process, and/or clear a fault.

Still referring to FIG. 3, the pump receptacle 38 can be configured to accept the power plug 8. Insertion of the power plug 8 into the pump receptacle 38 can provide electrical power to the sump pump 4, as well as place the sump pump 4 in electrical communication with the interior PCB. Similarly, the switch receptacle 40 can be configured to accept the power plug 10. Insertion of the power plug 10 into the switch receptacle 40 can provide electrical power to the piggy-back float switch 6, as well as place the piggy-back float switch 6 in electrical communication with the interior PCB. In some embodiments, the power adapter 34 can plug into the receptacles of a standard power outlet (e.g., outlet 12) via rear prongs (not shown). In this way, the power adapter 34 can selectively provide power to the sump pump 4 and the piggy-back float switch 6, the power supplied via a standard power outlet.

Notably, the power adapter 34 can be easily implemented in existing float switch systems. The invention alleviates any prior need for a piggy-back configuration. Accordingly, other types of float switches can be used with the power adapter 34. As shown in FIG. 3, a pseudo-plug 32 can be used to complete the circuit corresponding to the piggy-back float switch. In systems with other float switch types, however, the pseudo-plug 32 may not be used. The pseudo-plug 32 can be inserted into receptacles corresponding to the power plug 10.

Figure 4:
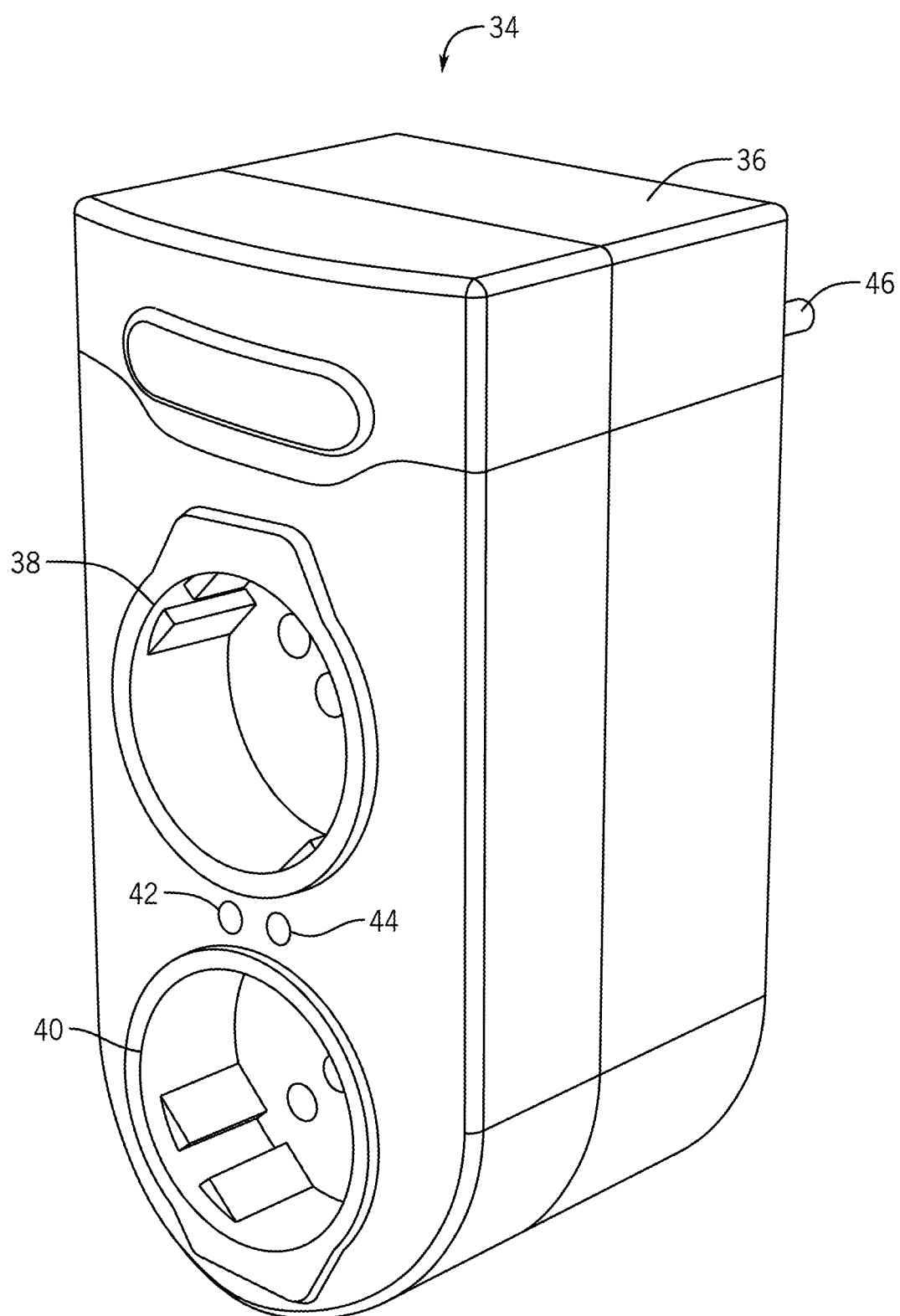
FIG. 4 is a front perspective view of a power adapter, in accordance with some embodiments of the invention.

Referring now to FIG. 4, an example embodiment of the power adapter 34 is shown. In some embodiments, the housing 36 can include recessed portions that complement the pump receptacle 38 and/or the switch receptacle 40. FIG. 4 further includes a rear prong 46. In some embodiments, three prongs can extend from the housing 36. The prongs can be inserted into receptacles on a standard power outlet, for example.

Further, in some embodiments, a second indicator 44 can be provided in addition to the indicator 42. Although shown positioned between receptacles, the indicator 42 can be positioned elsewhere on the housing 36. As one example, the indicator 42 can be positioned on a top surface of the housing 36, such that a user can view it when looking from above. In some embodiments, the indicator 42 can use varying colors or statuses to indicate different events. As one non-limiting example, the indicators 42, 44 can follow the colors/statuses shown in Table 1:

| Event | Color/Status |
|---|---|
| Over Current (pump running) | Yellow (blinking) |
| Over Current (pump stopped) | Yellow (solid) |
| Locked Rotor | Red (solid) |
| Excessive Run Time (pump running) | Yellow (blinking) |
| Excessive Run Time (pump stopped) | Yellow (solid) |
| Dry Run | Red (solid) |
| Current Sensor (pump running) | Yellow (blinking) |
| Current Sensor (pump stopped) | Yellow (solid) |
| Relay | Red (solid) |
| Float Switch (pump running) | Yellow (blinking) |
| Float Switch (pump stopped) | Yellow (solid) |
| High Water (pump running) | Yellow (blinking) |
| High Water (pump stopped) | Red (blinking) |
| Online/Offline (pump running) | Yellow (blinking) |
| Online/Offline (pump stopped) | Yellow (solid) |
| Home Power Lost | Off (N/A) |
| Firmware Update | Green (blinking; predetermined sequence) |

Figure 5:
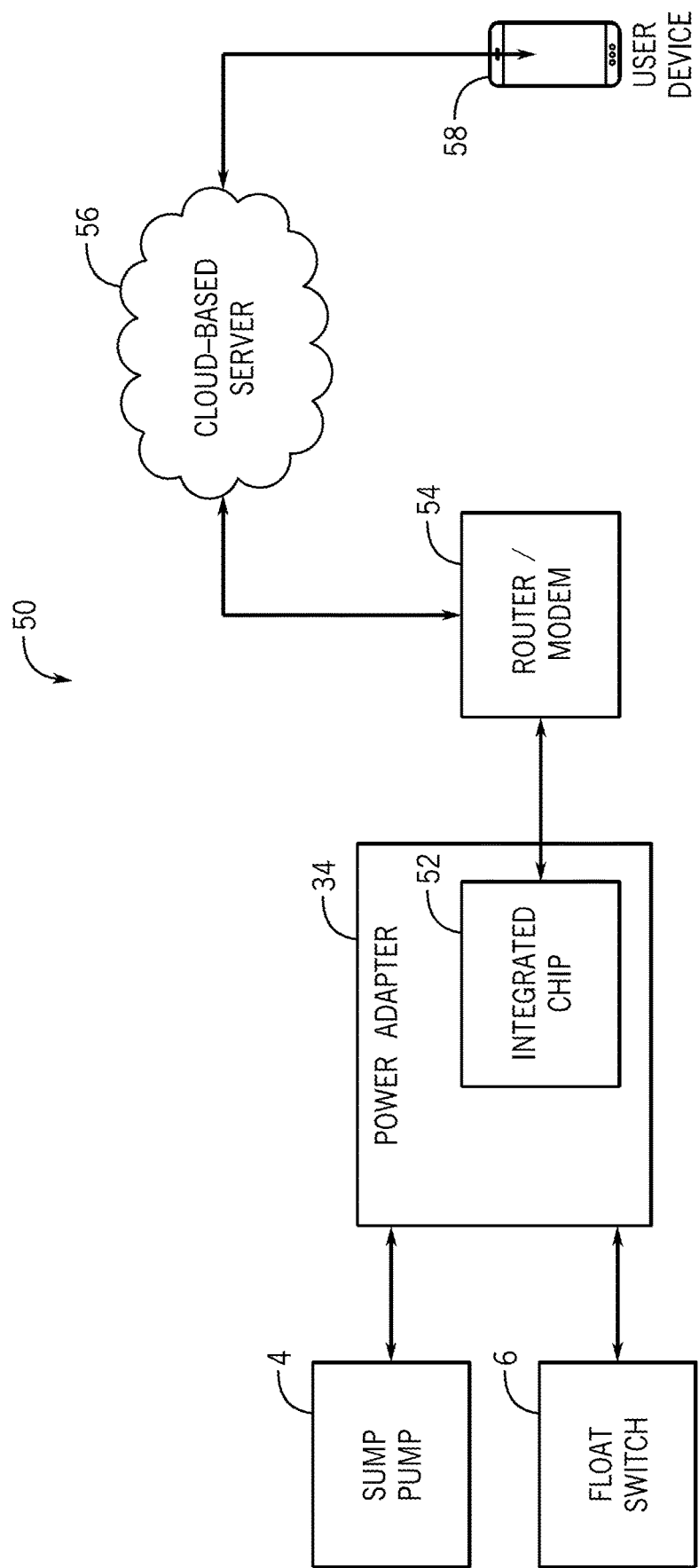
FIG. 5 is a block diagram of a communication network corresponding to a power adapter, in accordance with some embodiments of the invention.

Referring to FIG. 5, a block diagram of a communication network 50 corresponding to the power adapter 34 is shown, according to some embodiments of the invention. As shown, the sump pump 4 can be in communication with the power adapter 34. Similarly, the float switch 6 can be in communication with the power adapter 34. As discussed above, the power adapter 34 can include an integrated chip (integrated chip 52). The integrated chip 52 can be affixed to the internal PCB within the power adapter 34.

In some embodiments, the integrated chip (e.g., integrated chip 52) can be configured to function as a host device, with hybrid Wi-Fi & Bluetooth functionality. Further, the integrated chip can operate in multiple power modes (e.g., for low power consumption). In some embodiments, the integrated chip can include an antenna switch, RF balun, power amplifier, low-noise receive amplifier, filters, and/or power management modules.

In some embodiments, the integrated chip 52 can be configured to send and receive data to/from a remote computing device (e.g., a server, a mobile device, etc.). In some embodiments, the integrated chip 52 can communicate with the remote computing device using a router and/or modem that provides a connection between a local area network (LAN) to which the integrated chip is connected and a wide area network (WAN), such as the Internet. For example, the integrated chip 52 can be configured to connect to a wireless LAN (e.g., a Wi-Fi network) via a wireless router, and the router can be connected to a WAN via a modem. Additionally or alternatively, in some embodiments, the integrated chip 52 can be configured to act as a modem that is capable of providing a connection to a WAN without connecting first to a LAN. For example, the integrated chip 52 can be configured to act as a cellular modem that can communicate over a cellular network (e.g., a 3G network, a 4G network, etc., complying with any suitable standard, such as CDMA, GSM, LTE, LTE Advanced, WiMAX, etc.), which can provide access to the Internet. In such an example, the integrated chip 52 can communicate with a remote computing device (e.g., a server, a mobile device, etc.) without being connected to a LAN.

As shown by FIG. 5, in some embodiments, the integrated chip 52 can communicate with a router/modem 54, which can communicate with a cloud-based server 56. In some embodiments, the router/modem 54 can include any suitable combination of networking devices (e.g., one or more wireless routers, one or more wired routers, one or more Ethernet switches, one or more cable modems, one or more cellular modems, one or more optical network terminals, etc.). Additionally or alternatively, the router/modem 54 can include one or more combined devices, such as a combined wireless router and cable modem. In some embodiments, the router/modem 54 can include a standard, off-the-shelf router and/or modem used for connecting to the Internet via an internet service provider (ISP).

In some embodiments, the cloud-based server 56 can communicate with an internet enabled device (e.g., user device 58) using any suitable network or combination of networks. In some embodiments, the internet enabled device can be any suitable computing device that can communicate with the cloud-based server 56 via any suitable network or combination of networks. For example, the internet enabled device can be a smartphone, a tablet computer, a wearable computer, a laptop computer, a personal computer, a server computer, a virtual machine being executed by a physical computing device, a virtual personal assistant, a device providing access to a virtual personal assistant (e.g., a smart speaker), etc. As a non-limiting example, the internet enabled device is shown in FIG. 5 as the user device 58.

In some embodiments, the internet enabled device can communicate with the cloud-based server 56 via a LAN (e.g., via a router/modem, such as the router/modem 54, or a different router/modem that is located remotely from the router/modem 54 and is part of a different local area network). In some embodiments, the power adapter 34 can send and receive information (e.g., messages) to and from the internet enabled device (e.g., user device 58) via the cloud-based server 56. In some embodiments, the cloud-based server 56 can store data received from, or directed to, the power adapter 34 for later access (e.g., by the internet enabled device).

Note that in some embodiments, the power adapter 34 can connect to the router/modem 54 via another device, such as a hub that coordinates communications between connected devices (e.g., Internet of things devices) and a router. For example, such a hub can connect to one or more connected devices via a ZigBee connection, and can receive messages over a ZigBee mesh network from the power adapter 34 and relay the content of the message to a router in a format that is suitable for transmission over the Internet (e.g., a message formatted in compliance with TCP/IP).

In some embodiments, communications to and/or from the power adapter 34, the router/modem 54, the cloud based server 56, and/or the internet enabled device can be sent over a communication network, which can be any suitable communication network or combination of communication networks. For example, the communication network can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, etc., complying with any suitable standard, such as CDMA, GSM, LTE, LTE Advanced, WiMAX, etc.), a wired network, an EnOcean® network, etc. In some embodiments, the communication network can be a LAN, a WAN, a public network (e.g., the Internet), a private or semi-private network (e.g., a corporate or university intranet), any other suitable type of network, or any suitable combination of networks. Communications links between the power adapter 34, the router/modem 54, the cloud based server 56, and/or the internet enabled device can each be any suitable communications link or combination of communications links, such as wired links, fiber optic links, Wi-Fi links, Bluetooth links, cellular links, etc.

Figure 6:
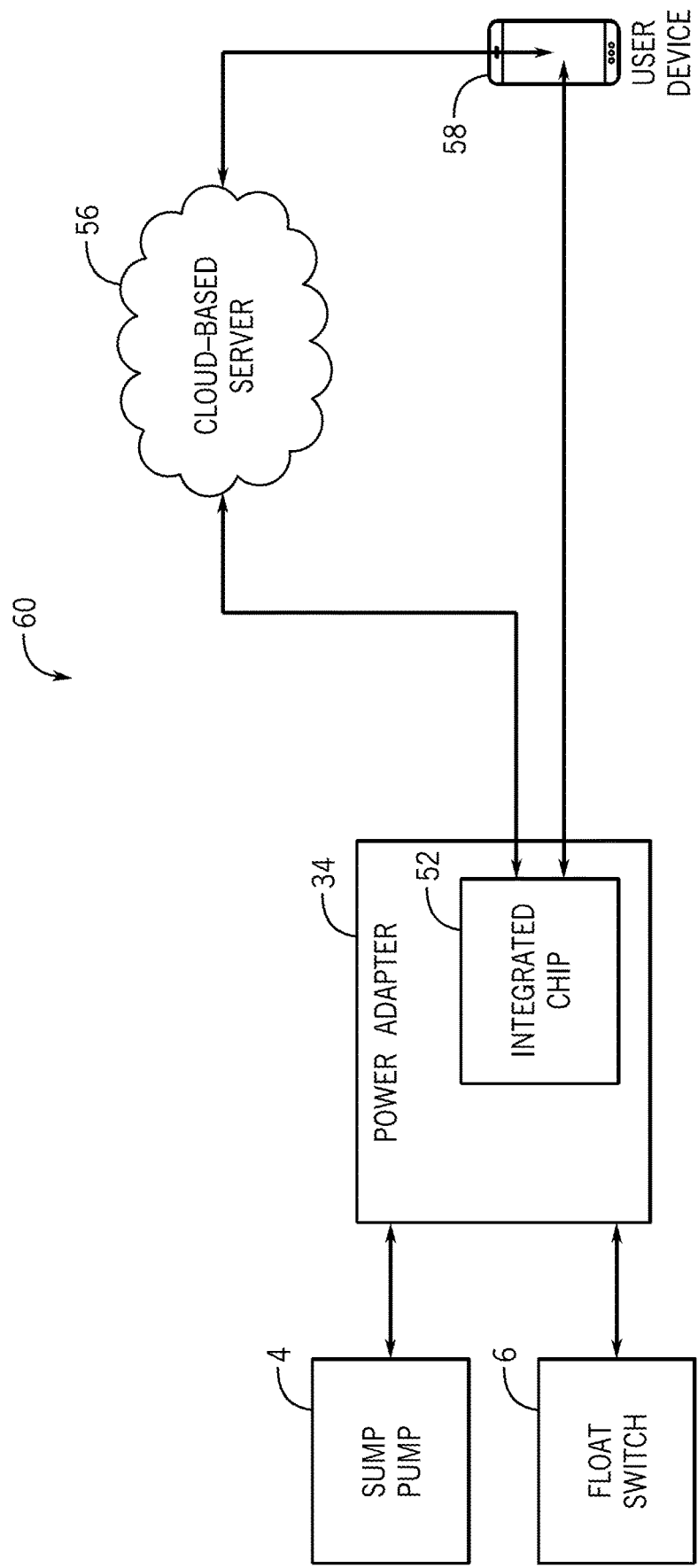
FIG. 6 is a block diagram of another communication network corresponding to a power adapter, in accordance with some embodiments of the invention.

FIG. 6 illustrates another example of a communication network 60 for communicating information to and/or from power adapter 34 to an internet enabled device in accordance with some embodiments of the invention. In some embodiments, the integrated chip 52 can be positioned within the power adapter 34, and can communicate with cloud based server 56 without the use of a router/modem. For example, in some embodiments, the integrated chip 52 can be configured to act as a cellular modem. Additionally or alternatively, in some embodiments, the integrated chip 52 can communicate with the internet enabled device (e.g., user device 58) directly (e.g., via a peer to peer connection such as a Bluetooth connection, a ZigBee Connection, a Z-Wave connection, a Wi-Fi connection in which the integrated chip and/or the internet enabled device acts as a discoverable node such as an ad hoc Wi-Fi connection or a Wi-Fi Direct connection, etc.) and/or indirectly (e.g., using a LAN, a WAN, the Internet, a combination of networks, using a mesh network such as a mesh Wi-Fi network, a mesh ZigBee network, a mesh Z-Wave network, etc.). As described above in connection with FIG. 5, the internet enabled device can communicate with the cloud based server 56 via any suitable network or combination of networks. In some embodiments, the power adapter 34 can send and receive information (e.g., messages) to and from the internet enabled device (e.g., user device 58) via the cloud based server 56 or via a peer connection or mesh network.

In some embodiments the integrated chip/PCB described above can coordinate operation of the float switch 6 and/or the sump pump 4, such as by controlling a relay to selectively provide power to sump pump 4 based on faults, user inputs, etc. Additionally or alternatively, in some embodiments, the integrated chip can monitor operation of the float switch 6 and/or the sump pump 4, for example, to determine whether a fault has occurred, such as a loss of power to the sump pump 4. In some embodiments, the integrated chip can periodically (at regular and/or irregular intervals) provide information to the cloud based server 56. For example, the integrated chip can monitor operation and provide information related to the operation to the cloud based server 56 every minute, every five minutes, every 15 minutes, every 30 minutes, every hour, every 12 hours, once per day, etc. As another example, the integrated chip can monitor operation and provide information related to the operation to the cloud based server 56 when a particular condition is met, such as when current falls below a particular threshold, when current rises above a particular threshold, etc. In such an example, the power adapter 34 can provide information related to operation to the cloud based server 56 when the condition is detected, when the condition has persisted for a particular length of time (e.g., one second, five seconds, one minute, etc.), or at any other suitable time. As yet another example, the integrated chip can monitor operation and provide information related to the operation to the cloud based server 56 in response to a request from the cloud based server 56. In such an example, a user interacting with cloud based server 56 can request status information related to operation, and the cloud based server 56 can request the information from the power adapter 34.

In some embodiments, the integrated chip can use one or more criteria to reduce the likelihood that the pump will be damaged due to short cycling in which the pump is cycled between on and off relatively quickly. For example, the integrated chip can keep the sump pump 4 running for a minimum amount of time when it is turned on regardless of whether the water level threshold has been reached. As another example, the integrated chip can keep the sump pump 4 off for a minimum amount of time after it has interrupted power to the sump pump 4 regardless of whether the water level threshold has been reached. As yet another example, the integrated chip can limit the number of times the sump pump 4 is cycled between on and off in a particular time period (e.g., every hour).

In some embodiments, the cloud based server 56 can store the received data in a location associated with the power adapter 34 (e.g., in a particular table, in connection with a particular address, etc.). Additionally or alternatively, the cloud based server 56 can store the data in a location associated with a particular user account associated with the power adapter 34. In some embodiments, the cloud based server 56 can store any suitable number of records, such as a particular number of most recent current readings (e.g., 50, 100, 1,000, etc.), power consumption for a particular recent time period (e.g., over the last day, week, month, year, etc.), a particular number of recent faults that have occurred (e.g., twenty, 50, 100, etc.). Note that although cloud based server 56 is described herein as being a cloud server, this is merely an example, and actions described as being performed by cloud based server 56 can be performed by a physical server that is under control of a service provider associated with the power adapter 34. Note that the configurations shown in FIGS. 5 and 6 are not mutually exclusive, as the integrated chip 52 can be configured to communicate both via a LAN and via a cellular modem.

In some embodiments, a user can create a user account by accessing the cloud based server 56 from the internet enabled device, and can associate the power adapter 34 with the account. In some embodiments, the power adapter 34 can provide status information to the cloud based server 56, and the user can access information associated with the user account from any suitable internet enabled device, which may or may not be the same device that was used to create the account.

As shown in FIGS. 5-6, the internet enabled device can be a smartphone (e.g., user device 58). In some embodiments, a user can install an application on the smartphone, allowing the user to access information associated with the user account administered by the cloud based server 56. Additionally or alternatively, in some embodiments, a user can use an internet browser installed on the smartphone to access a web page through which the user can use to access information associated with the user account administered by the cloud based server 56.

In some embodiments, a user can cause the internet enabled device to search for Bluetooth connections, and can select an available device that corresponds to the power adapter 34 and/or the sump pump 4. As another example, the power adapteradapter 34, when initially powered on (e.g., from an off state), can establish itself as a node in a peer-to-peer Wi-Fi network (e.g., an ad hoc Wi-Fi network or a Wi-Fi Direct connection) that accepts appropriate connection requests, and the power adapteradapter 34 may be configured to broadcast a particular service set identifier (SSID) and/or require a particular password that are preconfigured (e.g., from an EEPROM). The user can select the appropriate SSID and enter a password to connect directly to the power adapter 34 over a Wi-Fi connection. In such an example, the preconfigured SSID and password may be included in a label applied to the power adapter 34, on packaging in which the power adapter 34 was packaged, in literature accompanying the power adapter 34, and/or can be communicated using any other suitable technique. In such an example, the power adapter 34 can act as a node in a wireless ad-hoc network until it establishes a Wi-Fi connection with a wireless access point (e.g., a router), or until a particular period of time has elapsed (e.g., 15 minutes, 30 minutes, etc.). Additionally, in such an example, the power adapter 34 can have a user input (e.g., a hardware button or switch) that, when activated, causes the power adapter 34 to act as a discoverable node in a peer-to-peer Wi-Fi network. As yet another example, the power adapter 34 can be configured to accept new connections as part of a mesh network, such as a ZigBee network, a Z-Wave network, an EnOcean network, etc., and the user can utilize an application installed on the internet enabled device to add the power adapter 34 to an existing mesh network (e.g., including a hub), or to establish a connection directly with the power adapter 34.

In some embodiments, prior to establishing the connection, the user can (or may be required to) download an application that can be used to configure the power adapter 34. For example, a manufacturer, distributor, seller, and/or service provider associated with the power adapter 34 can provide an application that can be used to configure the power adapter 34. As another example, a third party can provide an application that can be used to configure the power adapter 34 (e.g., a provider of an application and/or system for managing connected devices). Additionally or alternatively, prior to establishing the connection, the user can (or may be required to) visit a particular web page that can be used to configure the power adapter 34. Such a web page can be a web page manufacturer, distributor, seller, and/or service provider associated with the power adapter 34. Additionally or alternatively, the web page can be a web page that is associated with the power adapter 34 that is to be configured (e.g., the web address can be uniquely identified with the particular power adapter 34). In some embodiments, when a connection is established with the power adapter 34, the power adapter 34 can prompt the user to download an appropriate application, or visit a particular web page, for configuring the power adapter 34.

In some embodiments, the power adapter 34 can be configured without requiring the user to establish a local connection to the power adapter 34. For example, if the power adapter 34 is implemented with a cellular modem, the user can download an application and/or visit a web page to configure the power adapter 34, and information can be provided to the power adapter 34 using a connection established by the cellular modem.

In some embodiments, a connection can be established between an internet enabled device and a service provided by the manufacturer, distributor, seller, or service provider associated with the power adapter 34, or by a third party. For example, the service can be provided by the cloud based server 56, which can register a user account, associate a power adapter 34 and/or sump pump 4 with the user account, collect information from the power adapter 34 and/or sump pump 4 associated with the user account, provide information and/or alerts to the user associated with the user account, receive instructions from the user through the service, send instructions to the power adapter 34 and/or sump pump 4, send information to someone authorized by the user (e.g., a technician such as a plumber, the manufacturer, distributor, seller, and/or service provider associated with the power adapter 34 and/or sump pump 4, etc.).

In some embodiments, the internet enabled device can download, install, and/or execute an application that can be used to configure the power adapter 34, and can create a user account within the application, or the internet enabled device can be directed by the application to load a web page that can be used to create a user account. Additionally or alternatively, in some embodiments, the internet enabled device can load a web page that can be used to configure the power adapter 34, and/or can be used to create a user account. In some embodiments, a user can register the power adapter 34 (e.g., through an application and/or web page), and can create a user account when registering the power adapter 34. In some embodiments, a user can register multiple residential devices with a given user account, which may include devices other than power adapters and/or sump pumps. In some embodiments, a user can access information stored in the cloud based server 56 by logging in to the user account. In some embodiments, a user account can be associated with any suitable information. For example, the user account can be associated with information about the user, such as contact information (e.g., address information, one or more email addresses, one or more phone numbers, etc.). As another example, the user account can be associated with information (e.g., a list) identifying devices associated with the user account. As yet another example, the user account can be associated with maintenance information. In a particular example, the user account can be associated with information about the sump pump 4 and/or the float switch 6, such as a pump size, a pump type, a pump setting, a basin depth, etc., which may assist a technician if maintenance is required. In some embodiments, the information corresponding to the sump pump 4 and/or float switch 6 may be automatically determined once the "device" is identified by the application.

In some embodiments, the user can register the power adapter 34 by providing information about the power adapter 34, such as such as a model number(s), a serial number(s), information about where the power adapter 34 was purchased (an online retailer, a distributor, a big box store, after market, etc.), installer information, etc.

In some embodiments, information provided when registering a power adapter 34 can be used to provide analytic information to a manufacturer, distributor, seller, and/or service provider associated with the power adapter 34. For example, the provided information can be accessed by customer support personnel, facilitating faster and/or more accurate diagnosis of a given problem, dispatch of replacement parts, and/or dispatch of service personnel.

In some embodiments, the user can configure when to send alerts to the user, how to send such alerts (e.g., by email, text message, push notification, etc.), a maximum number of alerts to send with a particular period of time (e.g., one every twenty four hours), for which conditions to send alerts to the user, etc.

In some embodiments, the power adapter 34 can include any suitable memory (not shown), which can include any suitable storage device or devices that can be used to store instructions, values, etc., that can be used, for example, by a hardware processor (e.g., the integrated chip) to control operation, to monitor operation, to communicate information to the cloud based server 56, etc. For example, memory can include any suitable volatile memory, non-volatile memory, storage, or any suitable combination thereof. For example, the memory can include RAM, ROM, EEPROM, one or more flash drives, one or more hard disks, one or more solid state drives, one or more optical drives, etc. In some embodiments, the memory can have encoded thereon a computer program for controlling operation of a hardware processor (e.g., the integrated chip) in the form of computer-executable instructions that, when executed by the hardware processor, cause a controller comprising the hardware processor to perform one or more actions as indicated by the instructions. For example, in some such embodiments, the integrated chip can execute at least a portion of the computer program to control operation of the sump pump 4 based on signals received from the float switch 6, to monitor operation, to transmit information to the cloud based server 56, etc.

In some embodiments, the power adapter 34 can include energy storage (not shown), such as a battery, an ultracapacitor, a fuel cell, etc. In some embodiments, the integrated chip can use power from the energy storage to continue to operate (e.g., to send information related to the status of the sump pump 4 and the float switch 6) when the standard power source (e.g., an outlet) is interrupted. This can be beneficial in situations such as residential power outages, where the operation of the sump pump 4 is still desired.

In some embodiments, the power adapter 34 can receive one or more instructions or commands from a server and/or an internet enabled device, and can change operation of the sump pump 4 and/or float switch 6 based on the received one or more instructions. For example, if a fault has occurred, a user can access a user interface provided by a service provider (e.g., via a web page loaded by the internet enabled device, an application being executed by the internet enabled device, via a virtual personal assistant, via an application program interface (API), etc.), and can select one or more instructions to be carried out. In a more particular example, the user can instruct the power adapter 34 to reset, to turn off the pump, to turn on the pump, to clear an alert, to clear a fault, etc. In some embodiments, instructions can be sent from an internet enabled device to the power adapter 34 without being sent first to the cloud based server 56 (although the instructions may pass through one or more servers while being routed from the internet enabled device to the power adapter 34).

FIGS. 7-15 show example processes for controlling operation of the sump pump 4, in accordance with some embodiments of the invention. Notably, data processing and analytics regarding the sump pump 4 and the float switch 6 can be performed by the cloud based server 56.

Figure 7:
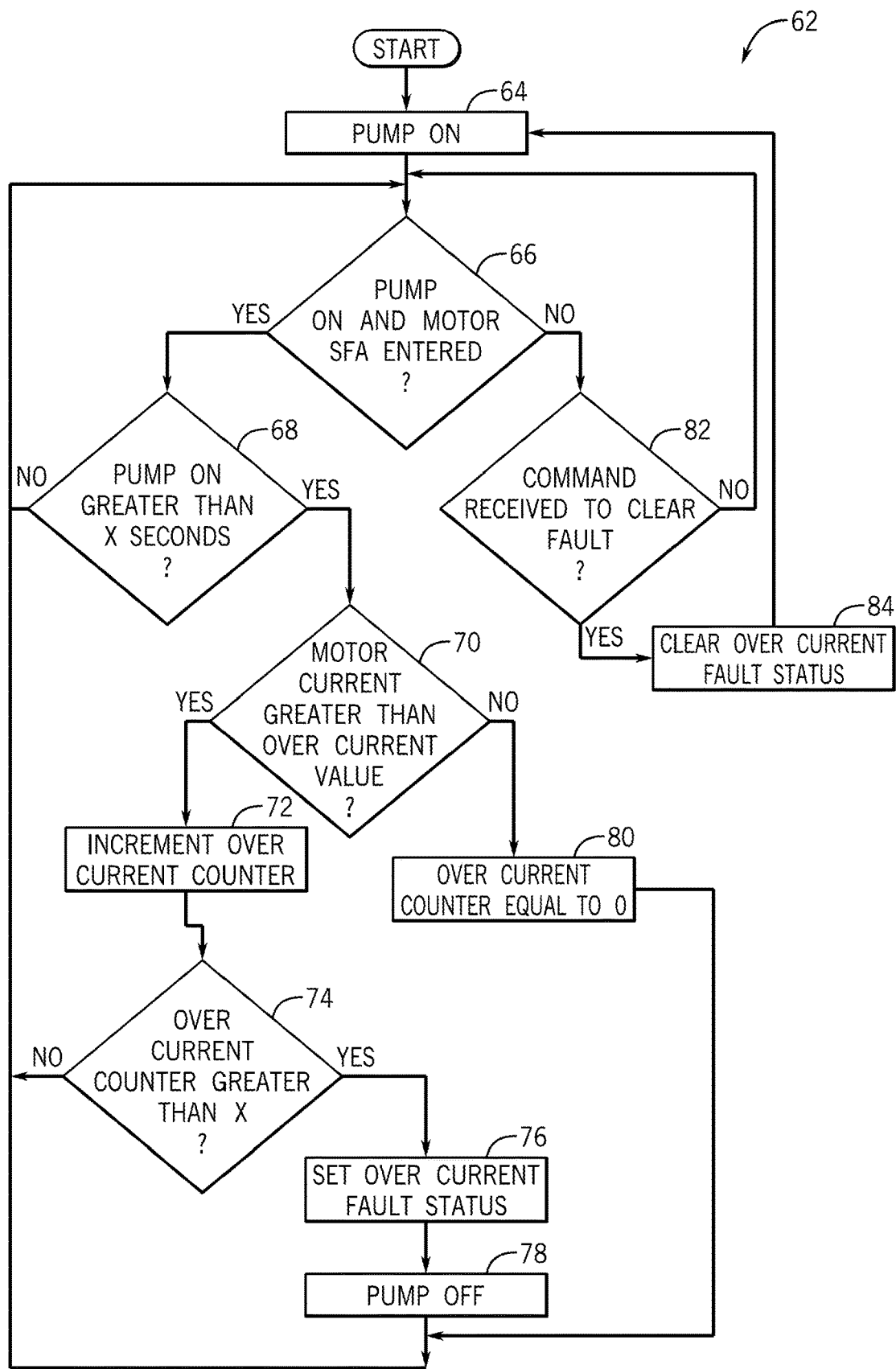
FIG. 7 is an example process for operating a sump pump, in accordance with some embodiments of the invention.

FIG. 7 shows an example of a process 62 for controlling operation of the sump pump 4 in accordance with some embodiments of the invention. Specifically, process 62 can control and monitor the sump pump 4 in view of overcurrent conditions.

Process 62 is shown to include turning on the pump (e.g., sump pump 4) at process block 64. Next, process 62 determines if the pump is on and if the motor is operating at its service factor load (service factor amps—SFA), at decision block 66. If the pump is on and if the motor is operating at its service factor load (i.e., the output of decision block 66 is "Yes"), then process 62 is shown to include determining if the pump has been on for a period of time greater than "X" seconds (decision block 68). In some embodiments, "X" can be any predefined time value. If the pump has been on for a period of time greater than "X" seconds (i.e., the output of decision block 68 is "Yes"), then process 62 is shown to include determining if the motor current is greater than an over current value (decision block 70). If the motor current is not greater than an over current value (i.e., the output of decision block 70 is "No"), then the over current counter can be reset to zero (process block 80). Alternatively, if the motor current is greater than an over current value (i.e., the output of decision block 70 is "Yes"), then the over current counter can be incremented (process block 72). Process 62 is shown to further include determining if the over current counter value is greater than "X." In some embodiments, "X" can be any predefined count value. If the over current counter is greater than "X" (i.e., the output of decision block 74 is "Yes"), then the over current fault status can be set (process block 76). Subsequently, the pump can be turned off (process block 78). Process 62 is then shown to return to decision block 66.

Returning to decision block 66, if the pump is on and the motor is not operating at its service factor load (i.e., the output of decision block 66 is "No"), then process 62 is shown to include determining is a command has been received to clear the fault (decision block 82). In some embodiments, this command can come from the Internet enabled device (e.g., the user device 58), as shown and described above, with respect to FIGS. 5-6. If a command to clear the fault has been received (i.e., the output of decision block 82 is "Yes"), then the over current fault status can be cleared (process block 84). Subsequently, process 62 can return to process block 64, and the pump can be turned on.

Figure 8:
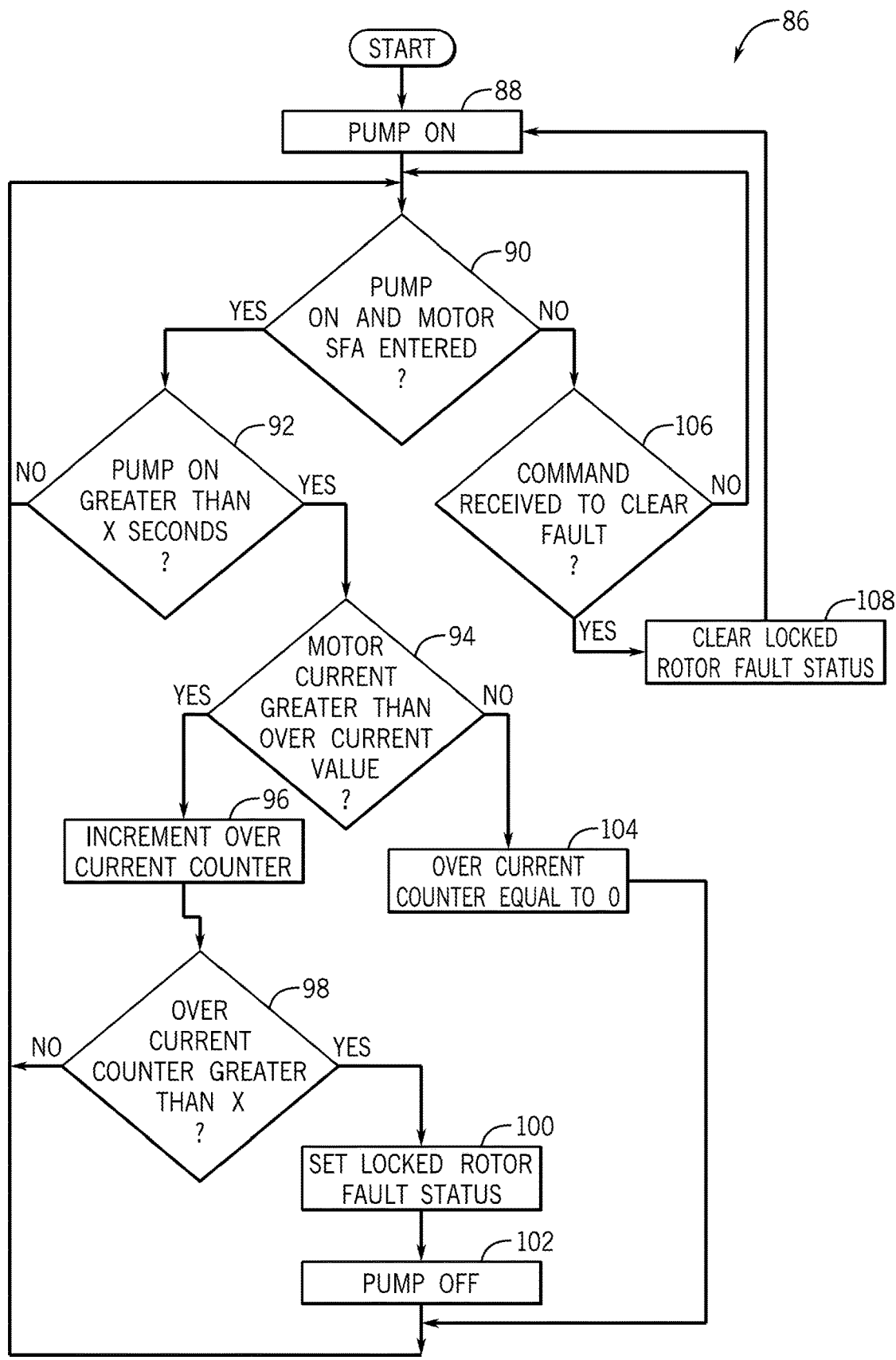
FIG. 8 is another example process for operating a sump pump, in accordance with some embodiments of the invention.

FIG. 8 shows an example of a process 86 for controlling operation of the sump pump 4 in accordance with some embodiments of the invention. Specifically, process 86 can control and monitor the sump pump 4 in view of locked rotor conditions.

Process 86 is shown to include turning on the pump (e.g., sump pump 4) at process block 88. Next, process 86 determines if the pump is on and if the motor is operating at its service factor load (service factor amps—SFA), at decision block 90. If the pump is on and if the motor is operating at its service factor load (i.e., the output of decision block 90 is "Yes"), then process 86 is shown to include determining if the pump has been on for a period of time less than "X" seconds (decision block 92). In some embodiments, "X" can be any predefined time value. If the pump has been on for a period of time less than "X" seconds (i.e., the output of decision block 92 is "Yes"), then process 86 is shown to include determining if the motor current is greater than an over current value (decision block 94). If the motor current is not greater than an over current value (i.e., the output of decision block 94 is "No"), then the over current counter can be reset to zero (process block 104). Alternatively, if the motor current is greater than an over current value (i.e., the output of decision block 94 is "Yes"), then the over current counter can be incremented (process block 96). Process 86 is shown to further include determining if the over current counter value is greater than "X." In some embodiments, "X" can be any predefined count value. If the over current counter is greater than "X" (i.e., the output of decision block 98 is "Yes"), then the locked rotor fault status can be set (process block 100). Subsequently, the pump can be turned off (process block 102). Process 86 is then shown to return to decision block 90.

Returning to decision block 90, if the pump is on and the motor is not operating at its service factor load (i.e., the output of decision block 90 is "No"), then process 86 is shown to include determining if a command has been received to clear the fault (decision block 106). In some embodiments, this command can come from the Internet enabled device (e.g., the user device 58), as shown and described above, with respect to FIGS. 5-6. If a command to clear the fault has been received (i.e., the output of decision block 106 is "Yes"), then the locked rotor fault status can be cleared (process block 108). Subsequently, process 86 can return to process block 88, and the pump can be turned on.

Figure 9:
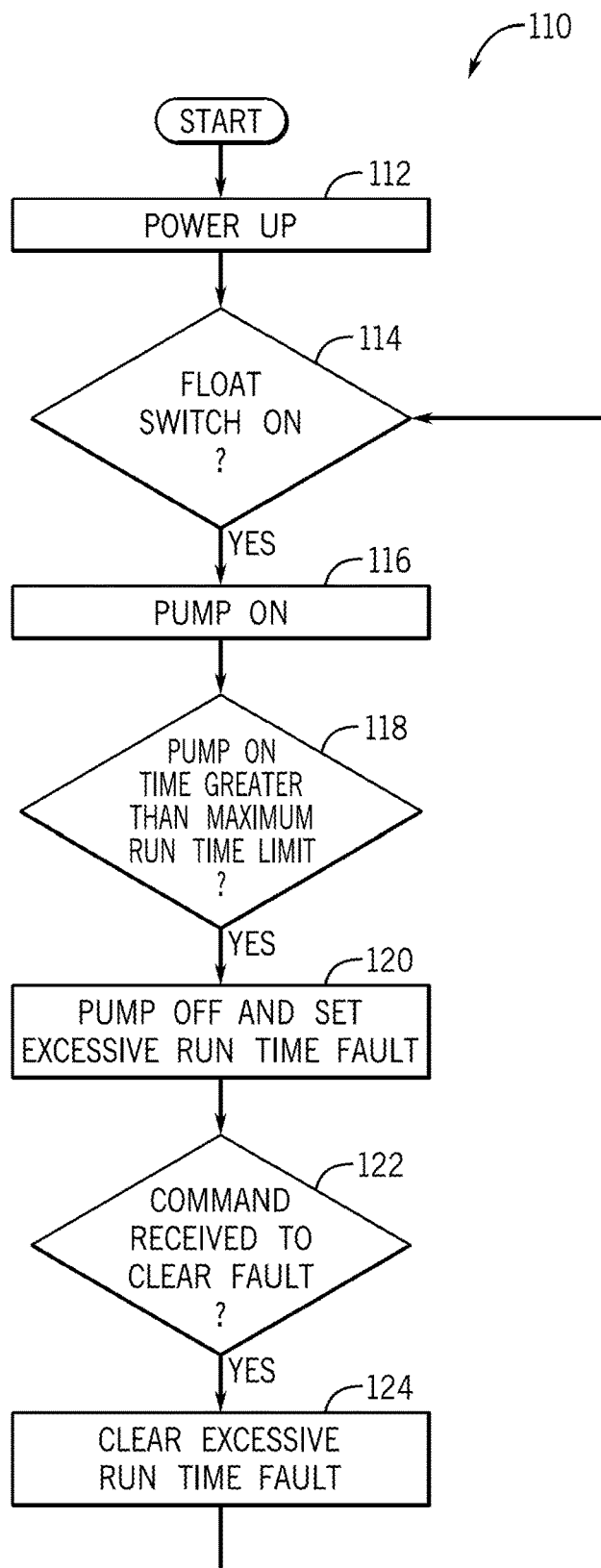
FIG. 9 is another example process for operating a sump pump, in accordance with some embodiments of the invention.

FIG. 9 shows an example of a process 110 for controlling operation of the sump pump 4 in accordance with some embodiments of the invention. Specifically, process 110 can control and monitor the sump pump 4 in view of run time limits.

As shown, process 110 can include, at process block 112, providing power to the power adapter (e.g., power adapter 34). Next, at decision block 114, process 110 is shown to include determining if the float switch (e.g., float switch 6) is on. If the float switch is on, then process 110 is shown to include, at process block 116, turning on the sump pump (e.g., sump pump 4). Next, at decision block 118, process 110 can determine if the sump pump on time has exceeded a maximum run time limit. In some embodiments, the maximum run time limit can be any predetermined time value. If the sump pump on time has exceeded the maximum run time limit, then the sump pump can be turned off at process block 120, and the excessive run time fault can be set. Process 110 is shown to further include, at decision block 122, determining if a command to clear the fault has been received. If the command to clear the fault has been received at decision block 122, than process 110 is shown to include clearing the excessive run time fault at process block 124, prior to again determining the state of the float switch.

Figure 10:
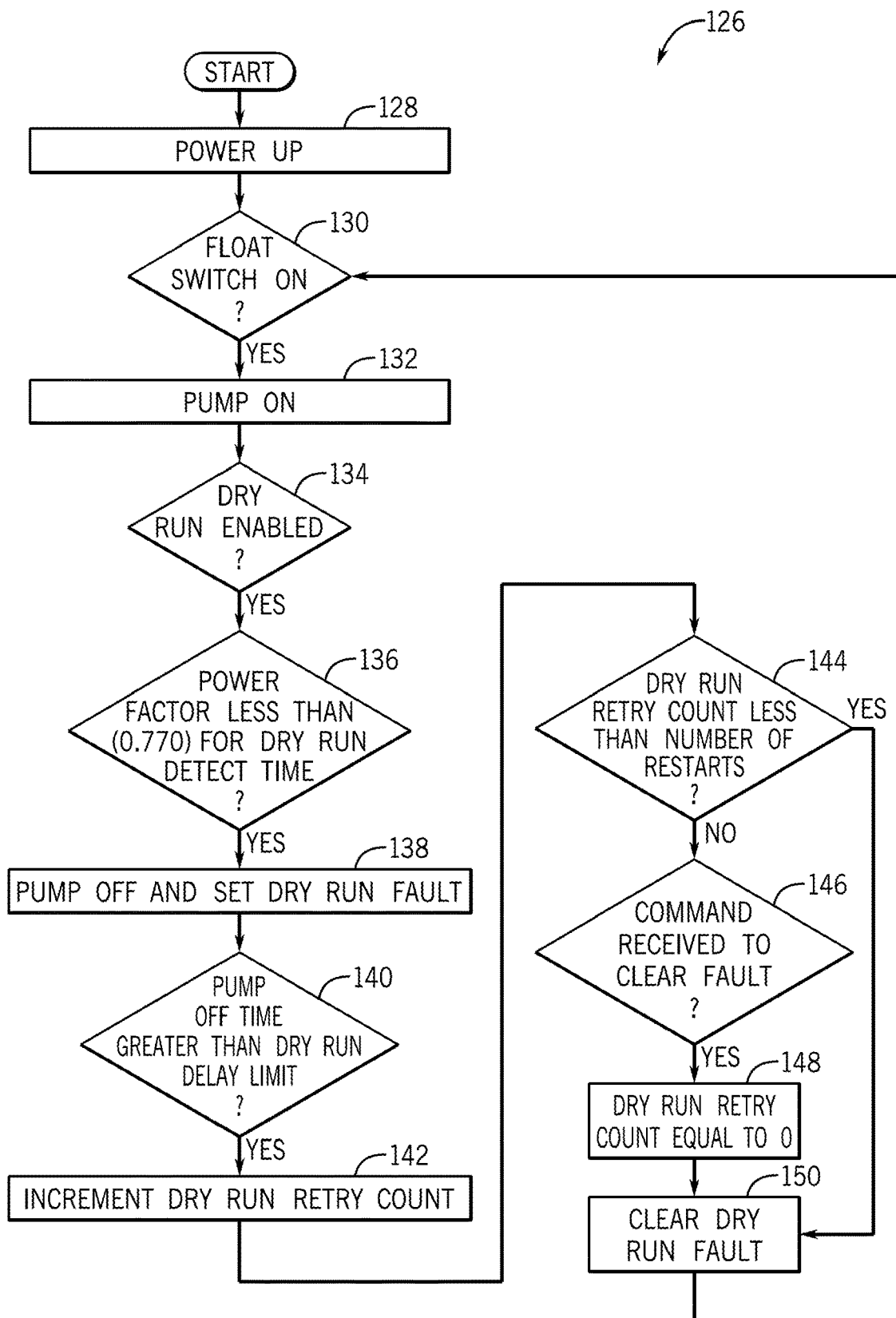
FIG. 10 is another example process for operating a sump pump, in accordance with some embodiments of the invention.

FIG. 10 shows an example of a process 126 for controlling operation of the sump pump 4 in accordance with some embodiments of the invention. Specifically, process 126 can control and monitor the sump pump 4 in view of dry run conditions.

As shown, process 126 can include providing power to the power adapter at process block 128 (e.g., power adapter 34). Next, process 126 is shown to include determining if the float switch (e.g., float switch 6) is on at decision block 130. If the float switch is on, then process 126 is shown to include turning on the sump pump (e.g., sump pump 4) at process block 132. Next, process 126 can determine if dry run is enabled at decision block 134. If dry run is enabled, then process 126 is shown to include determining if a power factor is less than 0.77X for a dry run detect time at decision block 136. In some embodiments, "X," the dry run detect time, and the multiplier can be any predetermined values. If the power factor is less than 0.77X for the dry run detect time, then the pump can be turned off and the dry run fault can be set at process block 138. Process 126 is shown to include determining if the pump has been off longer than a dry run delay limit at decision block 140. In some embodiments, the dry run delay limit can be any predetermined value. If the pump has been off longer than the dry run delay limit, then the dry run retry count can be incremented at process block 142. Next, process 126 is shown to include determining if the dry run retry count is less than or equal to the number of restarts at decision block 144. If the dry run retry count is less than or equal to the number of restarts, then the dry run fault can be cleared, and the status of the float switch can be checked again. Alternatively, if the dry run retry count is greater than the number of restarts, then process 126 is shown to include determining is a command to clear the fault has been received at decision block 146. If the command to clear the fault has been received, then the dry run retry count can be reset to zero at process block 148, and the dry run fault can be cleared at process block 150. As shown, process 126 can again check the status of the float switch.

Figure 11:
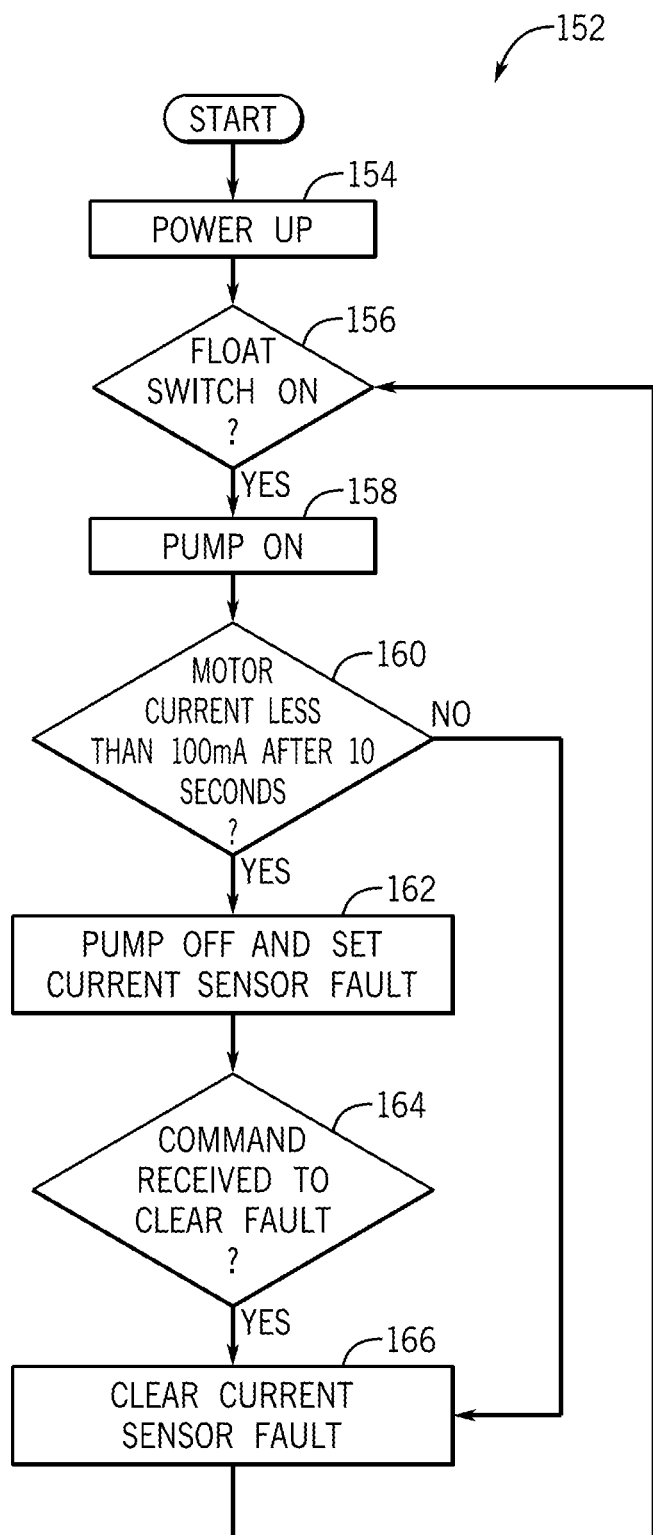
FIG. 11 is another example process for operating a sump pump, in accordance with some embodiments of the invention.

FIG. 11 shows an example of a process 152 for controlling operation of the sump pump 4 in accordance with some embodiments of the invention. Specifically, process 152 can control and monitor the sump pump 4 in view of motor current.

As shown, process 152 can include providing power to the power adapter (e.g., power adapter 34) at process block 154. Next, process 152 is shown to include determining if the float switch (e.g., float switch 6) is on at decision block 156. If the float switch is on, then process 152 is shown to include turning on the sump pump (e.g., sump pump 4) at process block 158. Next, process 152 can determine if the sump pump motor current is less than 100 mA after ten seconds at decision block 160. In some embodiments, these current and time threshold values can be different. If the sump pump motor current is not less than 100 mA after ten seconds, then the current sensor fault can be cleared at process block 162. Alternatively, if the sump pump motor current is less than 100 mA after ten seconds, then the pump can be turned off, and the current sensor fault can be set. Next, process 152 can determine if a command to clear the fault has been received at decision block 164. If a command to clear the fault has been received, then the current sensor fault can be cleared at process block 166.

Figure 12:
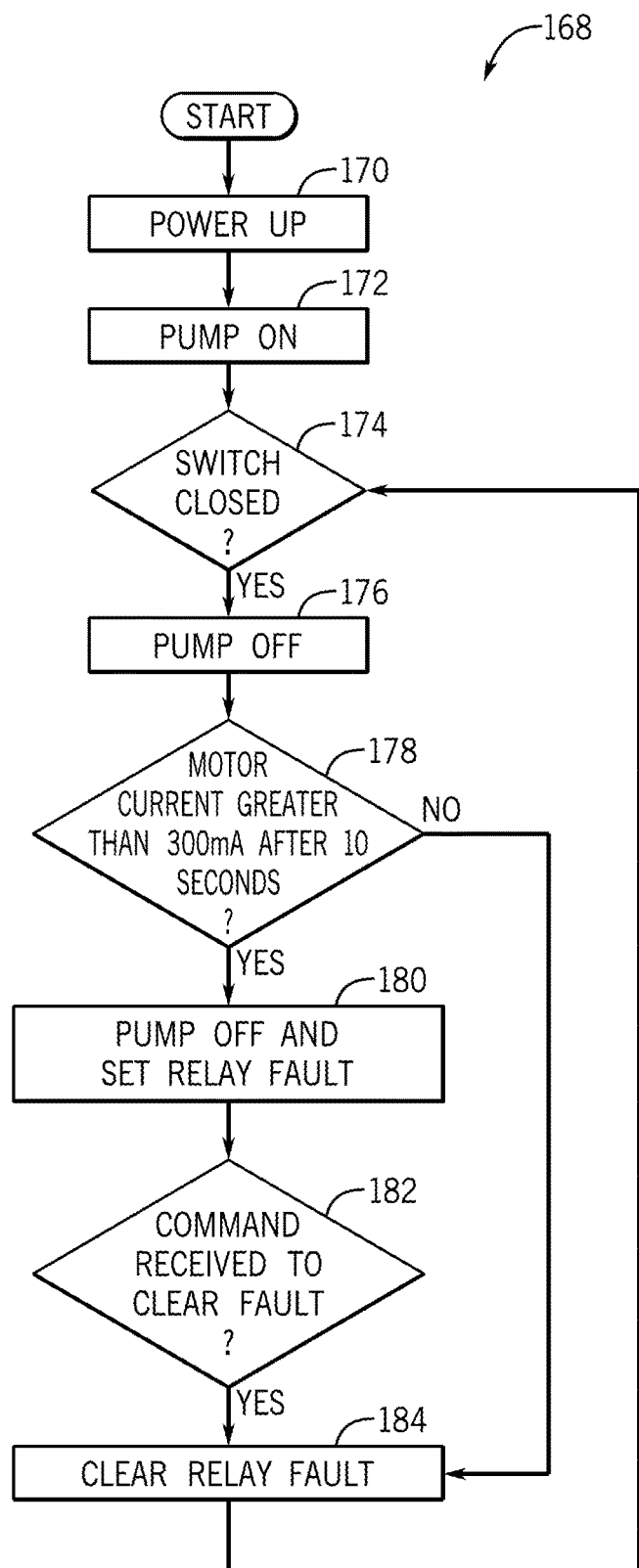
FIG. 12 is another example process for operating a sump pump, in accordance with some embodiments of the invention.

FIG. 12 shows an example of a process 168 for controlling operation of the sump pump 4 in accordance with some embodiments of the invention. Specifically, process 168 can control and monitor the sump pump 4 in view of relay operation.

As shown, process 168 can include providing power to the power adapter (e.g., power adapter 34) at process block 170. Next, the sump pump is turned on at process block 172. Process 168 is shown to include determining if the switch/relay is closed (e.g., NO relay 14) at decision block 174. If the relay is closed, then the pump can be turned off at process block 176. Next, process 168 is shown to include determining if the motor current is greater than 300 mA after ten seconds at decision block 178. In some embodiments, these current and time threshold values can be different. If the motor current is not greater than 300 mA after ten seconds, then the relay fault can be cleared. Alternatively, if the motor current is greater than 300 mA after ten seconds, then the pump can be turned off and the relay fault can be set at process block 180. Next, process 168 is shown to include determining if a command to clear the fault has been received at decision block 182. If a command to clear the fault has been received, then the relay fault can be cleared at process block 184. Process 168 can then again determine the position of the relay.

Figure 13:
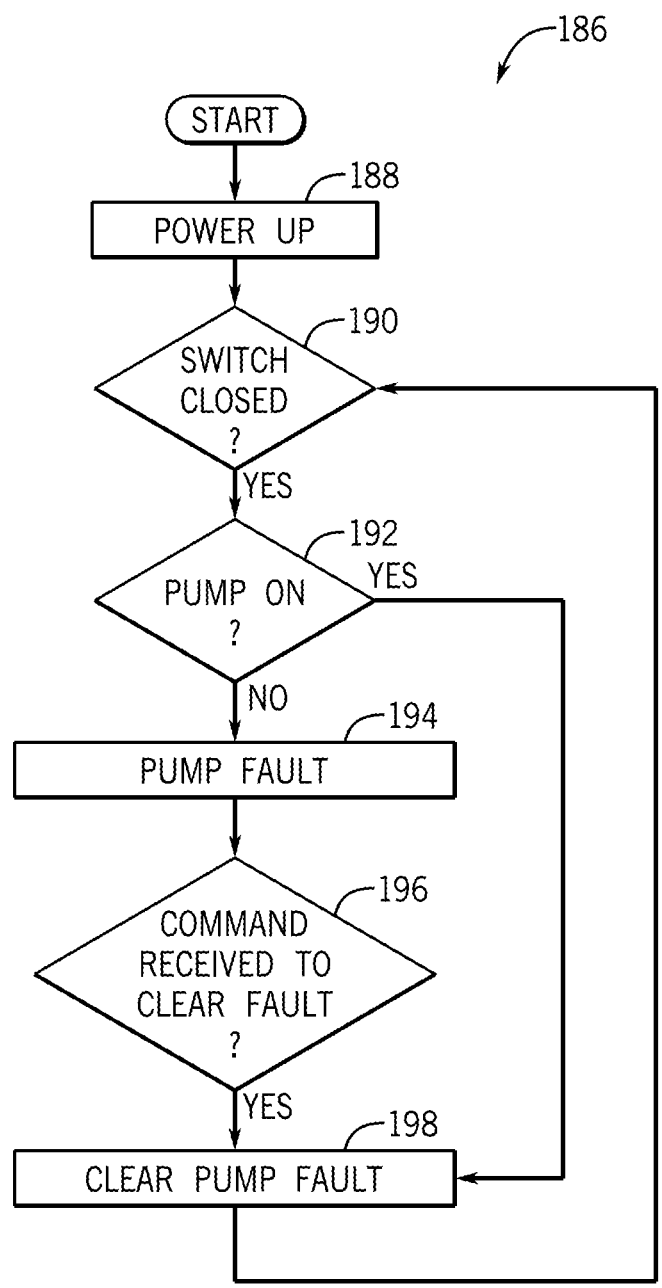
FIG. 13 is another example process for operating a sump pump, in accordance with some embodiments of the invention.

FIG. 13 shows an example of a process 186 for controlling operation of the sump pump 4 in accordance with some embodiments of the invention. Specifically, process 186 can control and monitor the sump pump 4 in view of pump faults.

As shown, process 186 can include providing power at process block 188. Next, process 186 determines if the relay is closed at decision block 190. If the relay is closed, then process 186 is shown to include determining if the sump pump is on at decision block 192. If the sump pump is on, then the pump fault can be cleared at process block 198. If the sump pump is not on, then the pump fault is set at process block 194. Next, process 186 is shown to include determining if a command to clear the fault has been received at decision block 196. If a command to clear the fault has been received, then the pump fault can be cleared at process block 198. Process 186 can then again determine the position of the relay.

Figure 14:
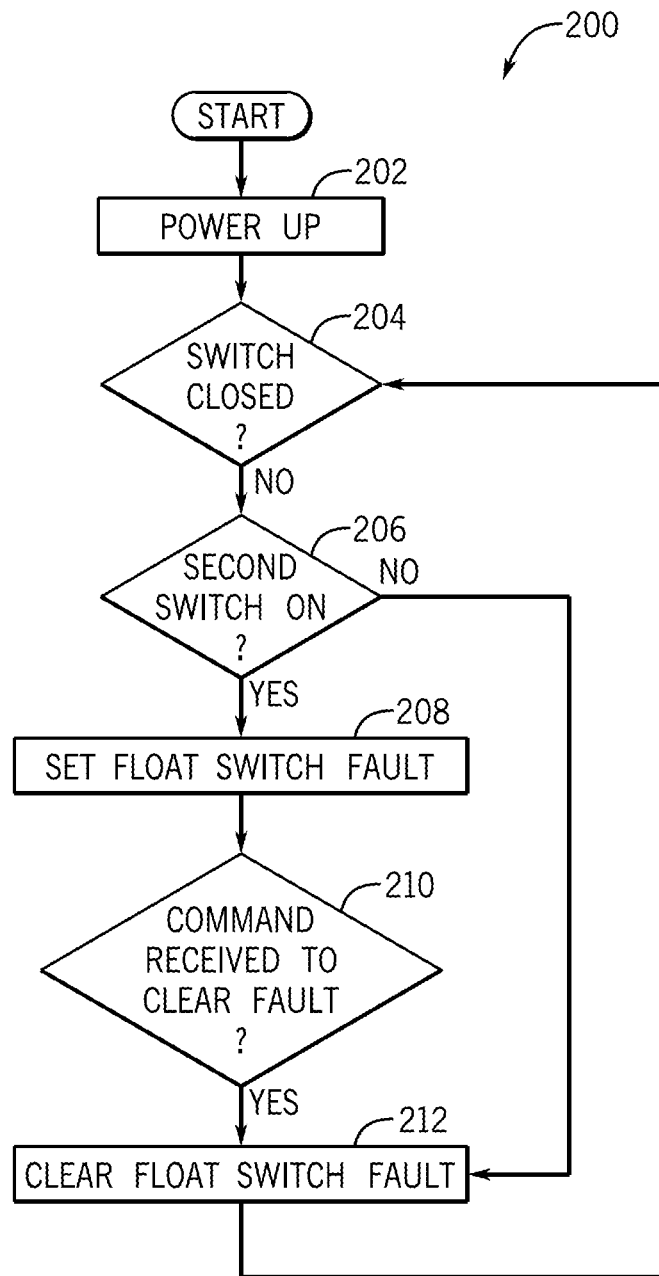
FIG. 14 is another example process for operating a sump pump, in accordance with some embodiments of the invention.

FIG. 14 shows an example of a process 200 for controlling operation of the sump pump 4 in accordance with some embodiments of the invention. Specifically, process 200 can control and monitor the sump pump 4 in view of float switch faults. In some embodiments, a second switch can be configured to turn on/off in response to a "high water" condition (e.g., an optional secondary float switch coupled to high water switch terminals that will be described below that can detect when a water level reaches a predetermined height, which can indicate a potential flood condition).

As shown, process 200 can include providing power at process block 202. Next, process 200 determines if the relay is closed at decision block 204. If the relay is open, then process 200 is shown to include determining if the second switch is on at decision block 206. If the second switch is not on, then the float switch fault can be cleared. If the second switch is on, then the float switch fault can be set at process block 208. Process 200 is shown to include determining if a command has been received to clear the fault at decision block 210. If a command to clear the fault has been received, then the float switch fault can be cleared at process block 212. Process 200 can then again determine the position of the relay.

Figure 15:
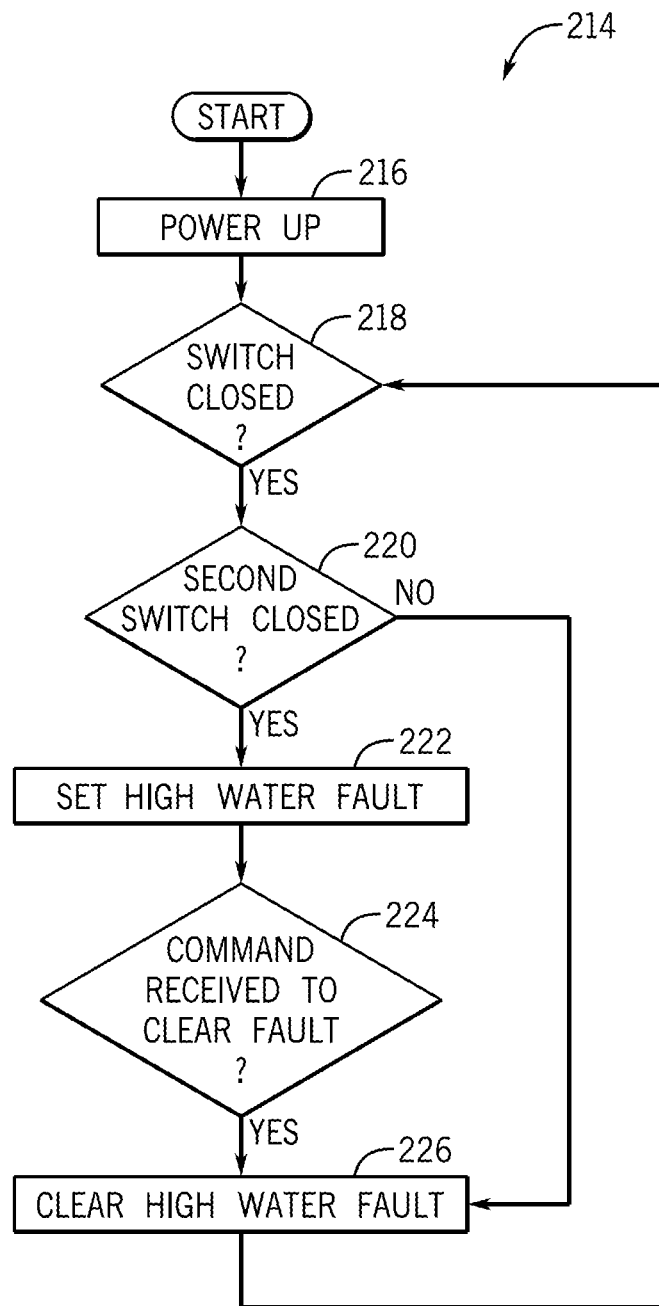
FIG. 15 is another example process for operating a sump pump, in accordance with some embodiments of the invention.
Figure 16A:
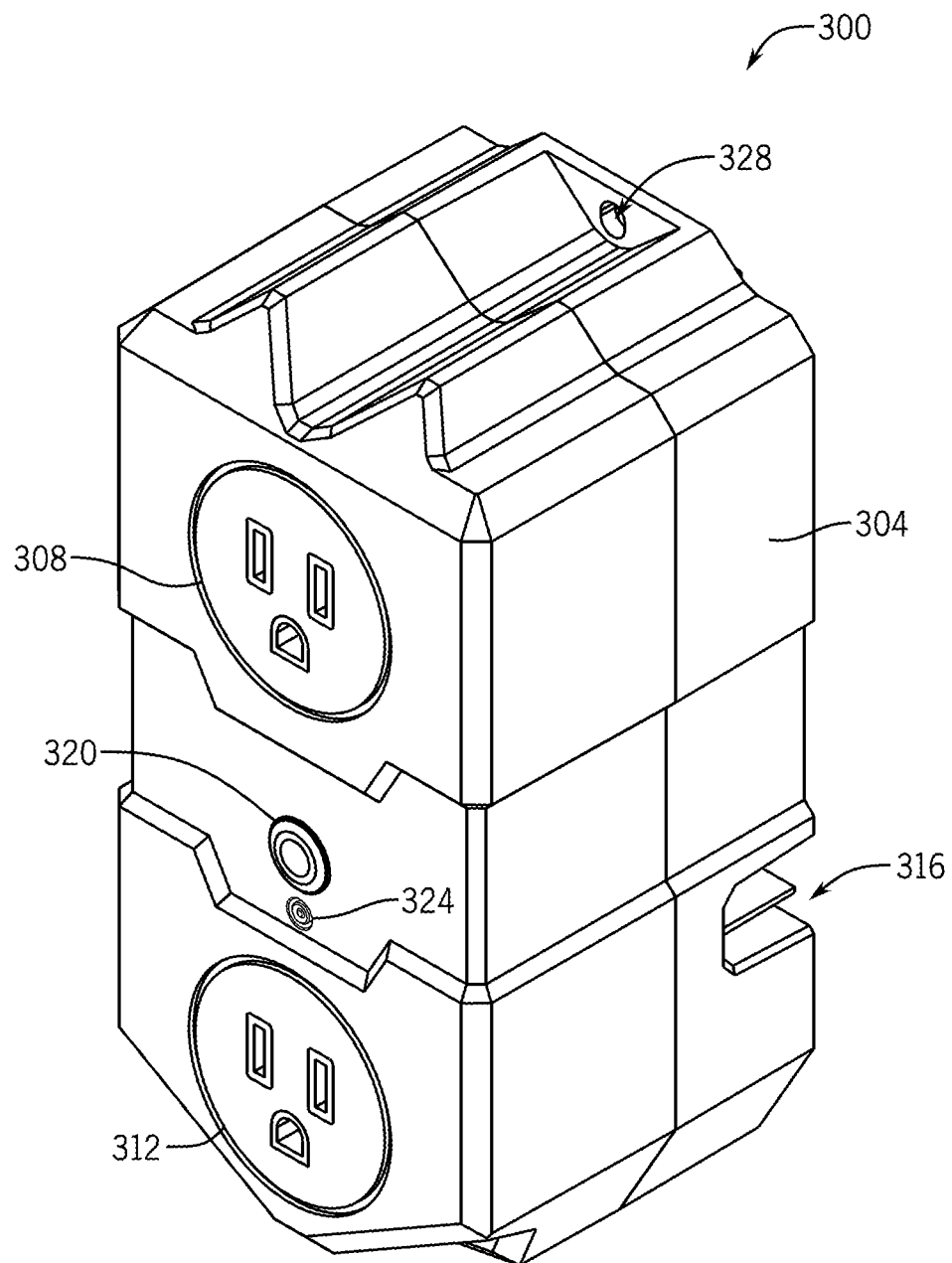
FIG. 16A is a front perspective view of another power adapter, in accordance with some embodiments of the invention.
Figure 16B:
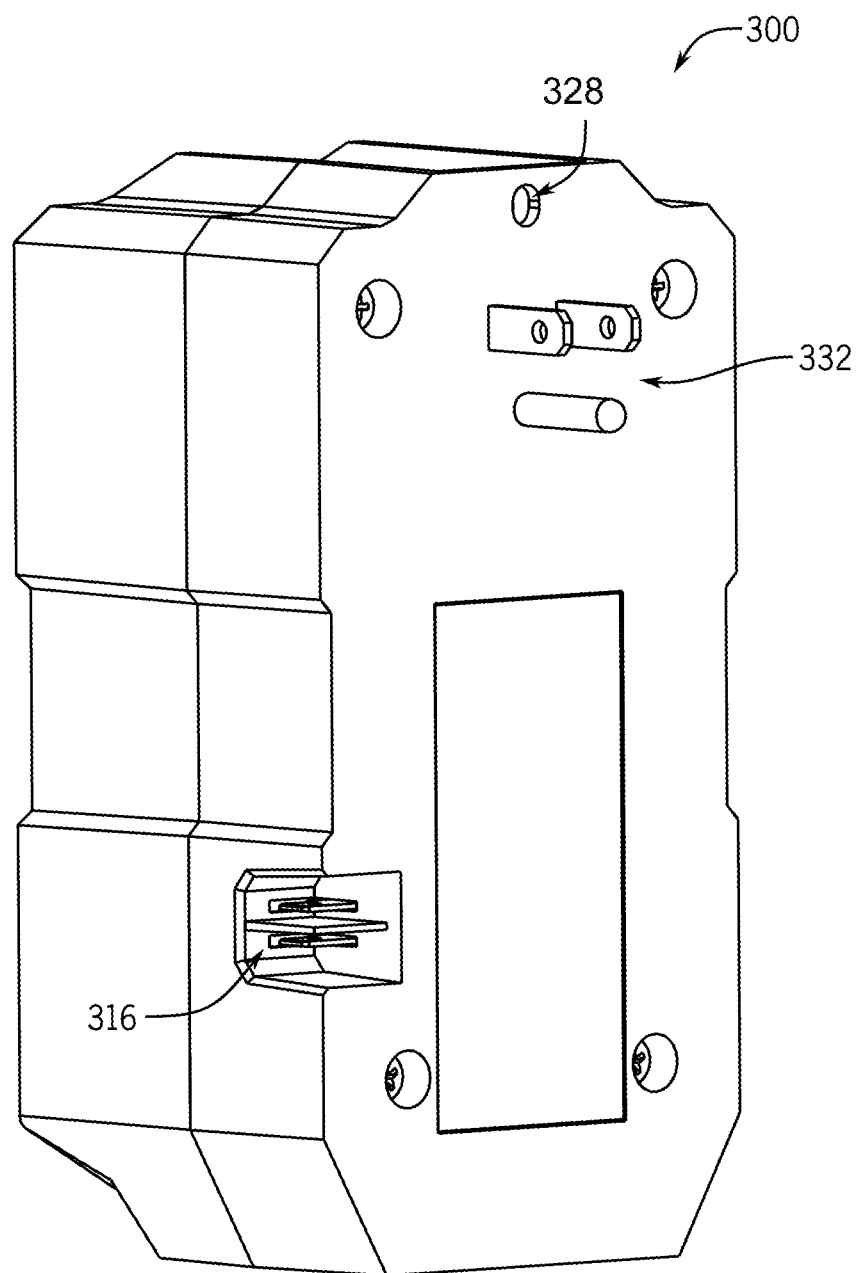
FIG. 16B is a rear perspective view of the power adapter of FIG. 16A.
Figure 17A:
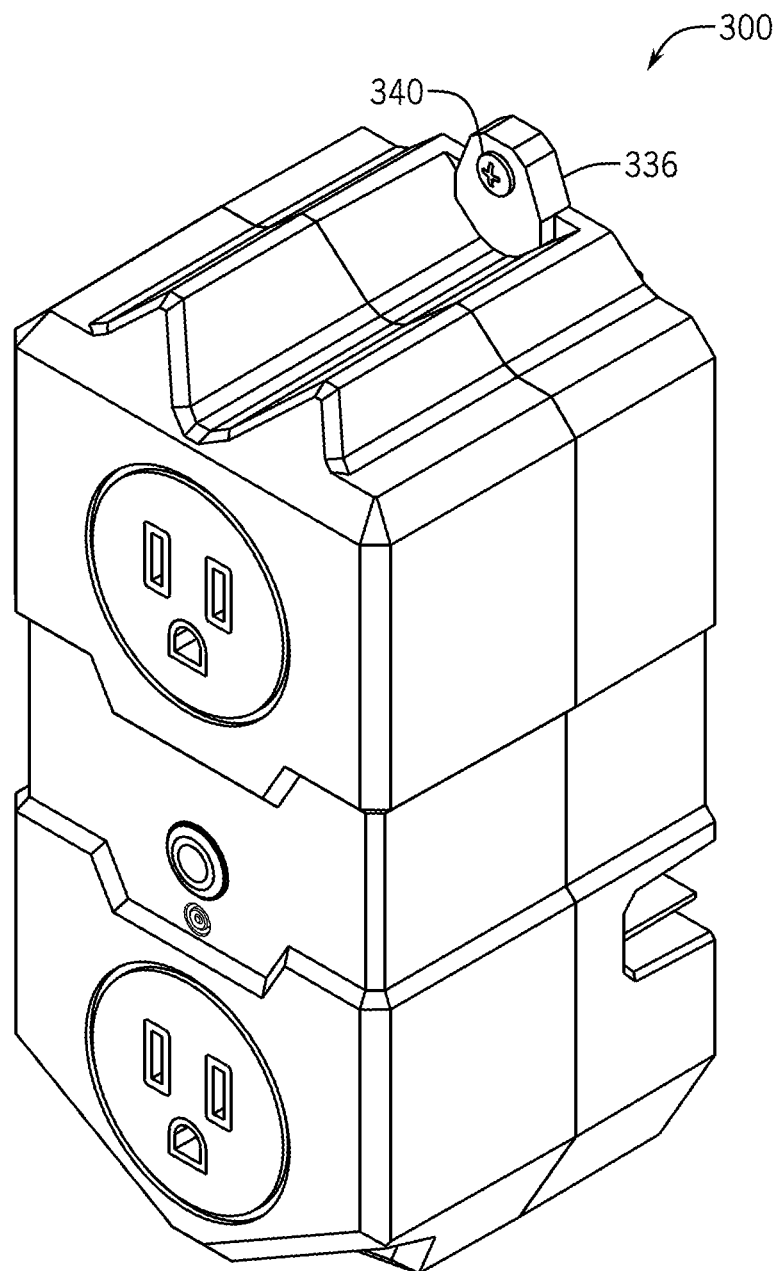
FIG. 17A is a front perspective view of the power adapter of FIG. 16A and a tab extension, in accordance with some embodiments of the invention.
Figure 17B:
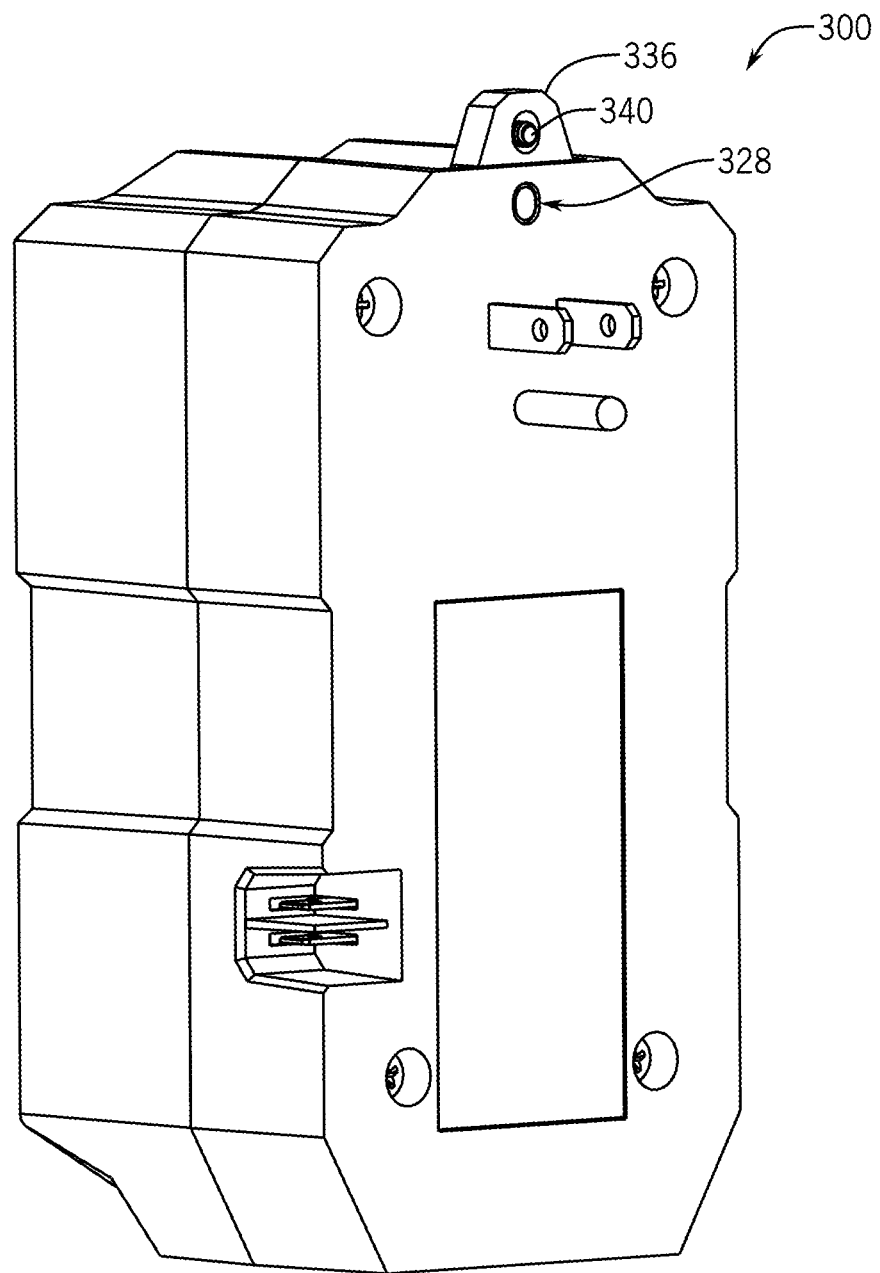
FIG. 17B is a rear perspective view of the power adapter of FIG. 16A and the tab extension, in accordance with some embodiments of the invention.
Figure 18:
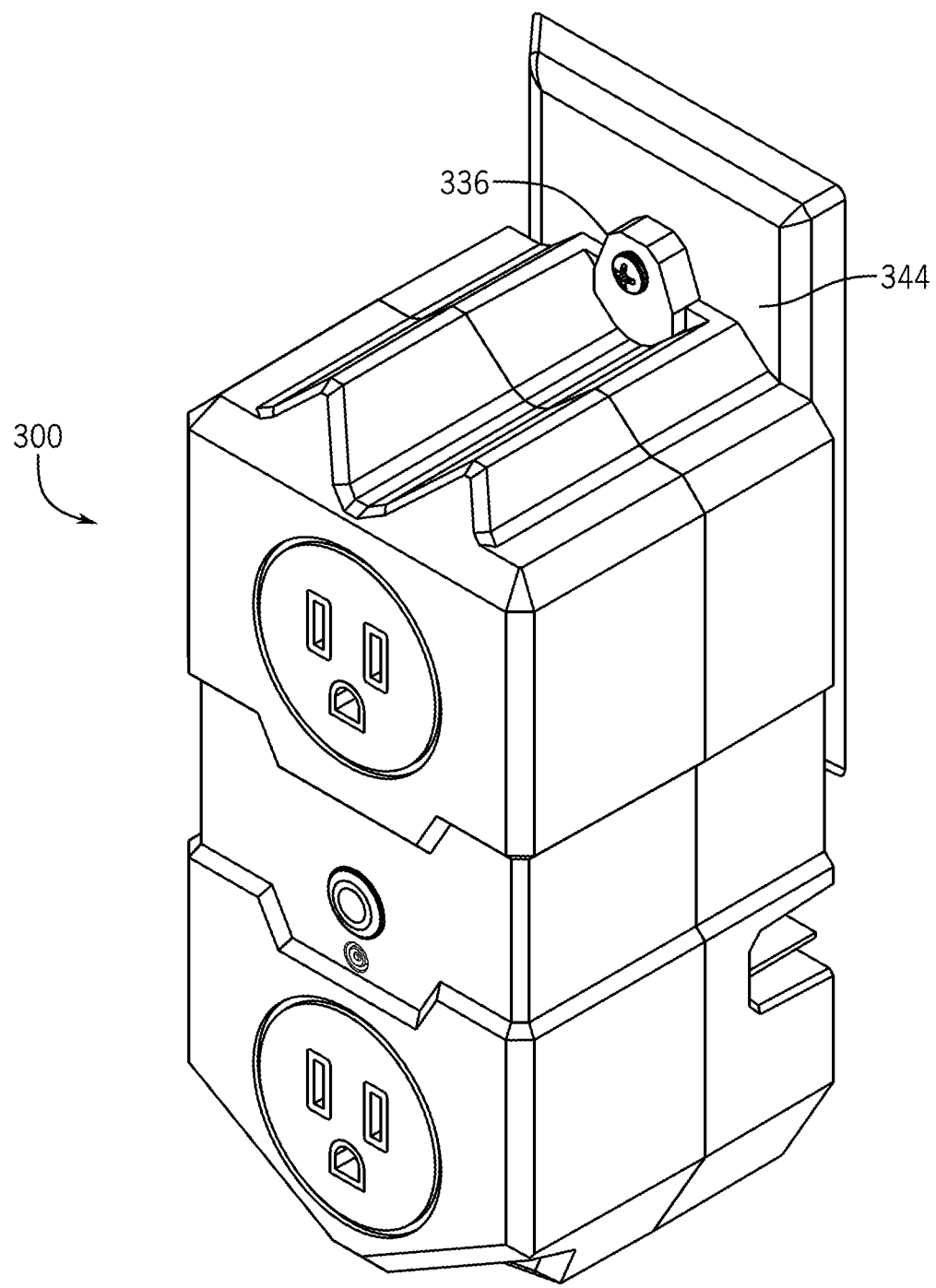
FIG. 18 is a front perspective view of the power adapter of FIG. 16A, the tab extension, and a simplex cover plate.
Figure 19:
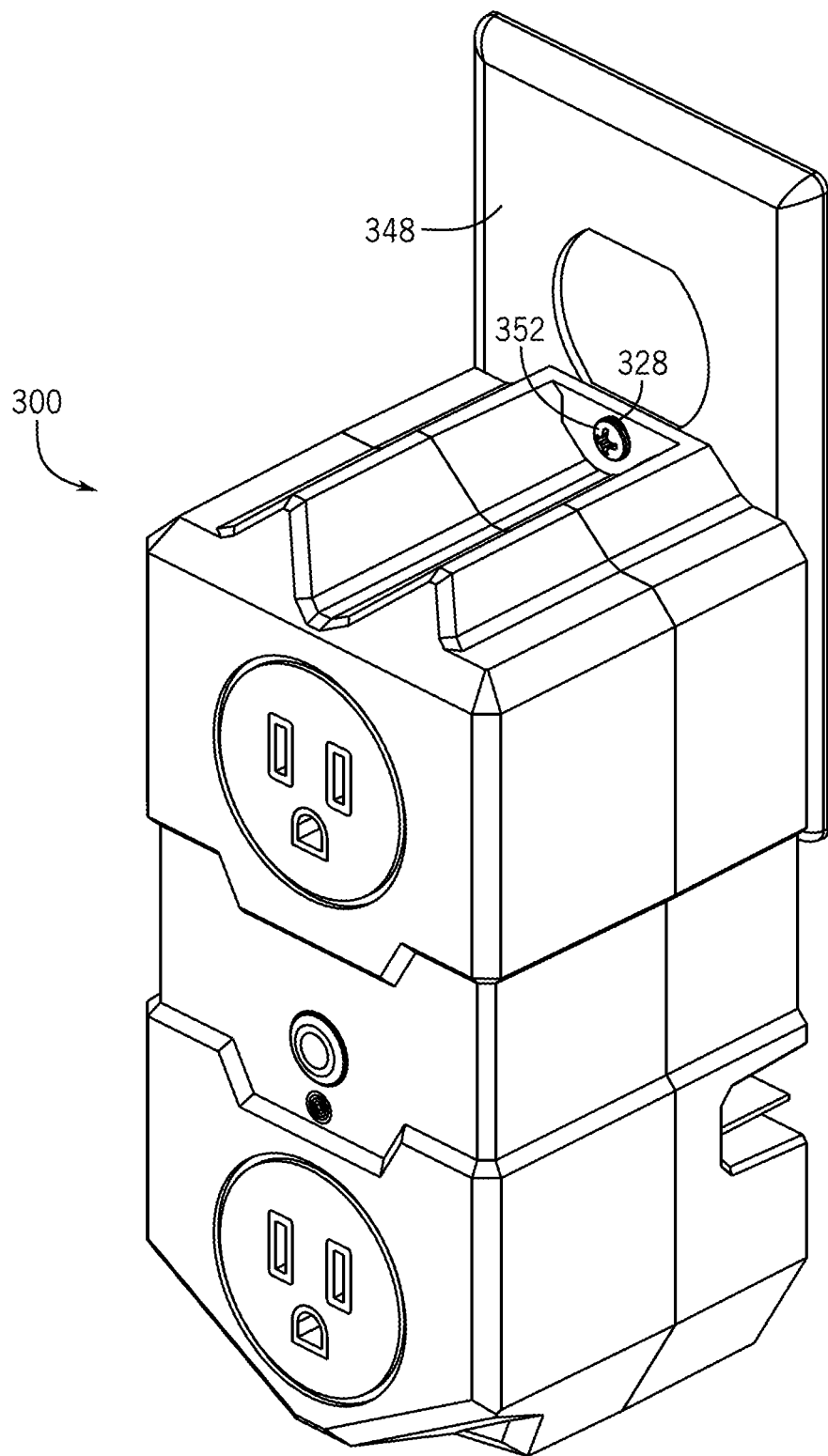
FIG. 19 is a front perspective view of the power adapter of FIG. 16A and a duplex cover plate.

FIG. 15 shows an example of a process 214 for controlling operation of the sump pump 4 in accordance with some embodiments of the invention. Specifically, process 214 can control and monitor the sump pump 4 in view of high water faults. As described above, some embodiments can include a second switch configured to detect high water conditions.

As shown, process 214 can include providing power at process block 216. Next, process 214 determines if the relay is closed at decision block 218. If the relay is closed, then process 214 is shown to include determining if the second switch is closed at decision block 220. If the second switch is open, then the high water fault can be cleared. If the second switch is closed, then the high water fault can be set at process block 222. Process 214 is shown to include determining if a command has been received to clear the fault at decision block 224. If a command to clear the fault has been received, then the high water fault can be cleared at process block 226. Process 214 can then again determine the position of the relay.

Referring now to FIGS. 3-6 as well as FIGS. 16-19, an embodiment of a power adapter 300 in accordance with various aspects of the invention is shown. The power adapter 300 can include at least a portion of the components included in the power adapter 34 described above, as well as perform at least a portion of the functions and/or processes that the power adapter 34 can perform as described above. The power adapter 300 can include a housing 304 configured to support and contain a printed circuit board (PCB). In some embodiments, the PCB can be electrically coupled to an integrated chip (e.g., integrated chip 52 described above). The PCB and integrated chip can be referred to as a controller. Note that although the power adapter 300 is described as including the integrated chip, this is merely an example, and any suitable type of hardware processor or combination of hardware processors can be used to monitor and/or control the sump pump 4 and the float switch 6. The integrated chip and PCB can be coupled to one or more sensors contained within the housing 304 and configured to monitor operation of the pump 4, such as a current sensor configured to sense an amount of power supplied to the pump 4. The integrated chip can be placed in communication with a user device such as the user device 58.

The power adapter 300 can include a pump receptacle 308 configured to accept the power plug 8. The pump receptacle 308 can include three terminals for an AC pump. Insertion of the power plug 8 into the pump receptacle 38 can provide electrical power to the sump pump 4, as well as place the sump pump 4 in electrical communication with the interior PCB. Similarly, the power adapter 300 can include a switch receptacle 312 configured to accept the power plug 10. The switch receptacle 312 can include three terminals. Insertion of the power plug 10 into the switch receptacle 312 can provide electrical power to the piggy-back float switch 6, as well as place the piggy-back float switch 6 in electrical communication with the interior PCB. In some embodiments, the power adapter 300 can plug into the receptacles of a standard power outlet (e.g., outlet 12) via rear prongs 332. In this way, the power adapter 300 can selectively provide power to the sump pump 4 and the piggy-back float switch 6, the power supplied via a standard power outlet.

The housing 304 can include an indicator 324 (e.g., an LED indicator) configured to operate with various colors similar to the indicators 42 and/or 44 as described above. The housing 304 can also include a manual input device 320.

While depicted as a pushbutton, the manual input device 324 can also be a selector switch, a recessed button, etc. configured to initiate a factory reset process, a manual pump operation process, and/or clear a fault. The manual input device 320 could also be used to activate a local mode of the power adapter in which the power adapter 300 communicates directly with a smartphone or other user device over a Bluetooth or direct WiFi connection.

The pump can also include supplementary terminals 316 for a second switch (i.e. a high water switch). The terminals can be coupled to a high water sensor (not shown) with a two wire connection interface. The high water sensor can be used as the second switch in the processes 200 and 214 described above.

The housing 300 can include a mounting hole 328 configured to allow a user to attach the power adapter 300 to a wall outlet. More specifically, the mounting hole 328 can be sized and positioned and oriented to allow a user to insert a screw 352 into a duplex wall outlet (not shown) covered by a cover plate 348. The duplex wall outlet includes two receptacles. The screw 352 can be inserted through the mounting hole 328 and the cover plate 348 and screwed into threads included in the duplex wall outlet. The screw 352 can then hold the power adapter 300 and the cover plate 348 securely to the duplex wall outlet.

A tab extension 336 can be used with a screw 340 to attach the power adapter 300 to a simplex wall outlet (not shown) covered by a cover plate 344. The simplex outlet includes a single receptacle. The tab extension 336 can be inserted into the mounting hole 328 and the screw 340 can be inserted through a secondary mounting hole in the tab extension in order to fasten the power adapter 300 and the cover plate 344 to the simplex wall outlet. The secondary mounting hole can be oriented to accept the screw 340 for insertion into the simplex wall outlet to affix the power adapter 300 to the simplex wall outlet. The tab extension 336 and the mounting hole 328 provide a durable and cost effective method to securely fasten the power adapter 300 to either a simplex or duplex wall outlet.

Referring now to FIG. 20, an exemplary process 400 for determining a time value for running the pump 4 after the float switch 6 has been turned off in order to reduce a number of motor starts for the pump 4 is shown. The process 400 can reduce the number of motor starts by allowing the pump 4 to evacuate water that may still be present even after the float switch 6 has turned off. A controller included in the power adapter (e.g., the power adapter 34 and/or 300) can be configured to execute the process 400.

At 404, the process 400 can determine that the float switch 6 is on. As described above, the float switch can be coupled to a power adapter such as the power adapter 300. The process 400 can then proceed to 408.

At 408, the process 400 can provide power to the pump 4. The process 400 can then proceed to 412.

At 412, the process 400 can sense a current provided to the pump 4. The current can be sensed using a current sensor positioned within the power adapter. The process 400 can continuously sense the current. In some embodiments, another value can be sensed, such as power supplied to the pump 4. The process 400 can then proceed to 414.

At 414, the process 400 can determine whether or not the float switch is off. The process 400 can then proceed to 416.

At 416, if the process 400 determined that the float switch 6 is off (e.g., "YES" at 416), the process 400 can proceed to 418. If the process 400 determined that the float switch 6 is not off (e.g., "NO" at 416), the process 400 can proceed to 414.

At 418, the process 400 can determine whether or not the current is below a predetermined threshold value. In embodiments that sense a different electrical value at 412, such as embodiments that sense power supplied to the pump 4, the process 400 can determine the electrical value is below a predetermined threshold value. The predetermined threshold value can correspond to the current used by the pump when running but not pumping water (e.g., running dry). In this way, the process 400 can determine when the pump 4 is actually done evacuating out water. The process 400 can then proceed to 420.

At 420, if the process 400 determined that the current is below the predetermined threshold value (e.g., "YES" at 420) the process 400 can proceed to 424. If the process 400 determined that current is not below the predetermined threshold value (e.g., "NO" at 420), the process 400 can proceed to 418.

At 424, the process 400 can determine a time value that has elapsed between the determining that the float switch is off at step 420 and the determining that the current is below a threshold value at step 420. In some embodiments, the process 400 can start a timer when the float switch has been determined to be off and stop the timer once the current has been determined to be below the predetermined threshold value. The process 400 can then proceed to 428.

At 428, the process 400 can output the time value or save the time value in a memory to be used to run the pump 4 as will be described below.

Figure 21:
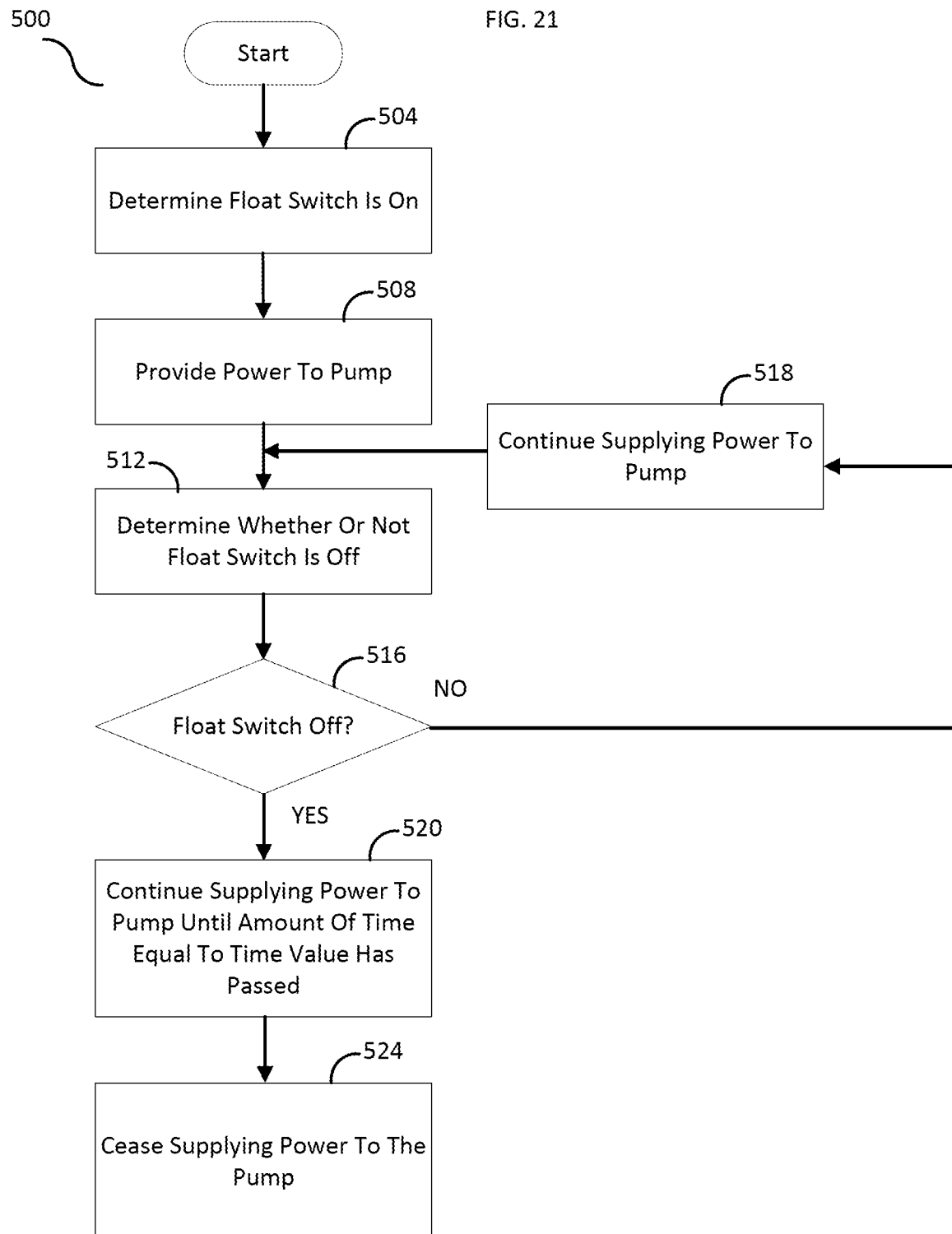
FIG. 21 is an exemplary process for controlling or operating the sump pump based on the time value determined using the process of FIG. 20.

Referring now to FIG. 20 as well as FIG. 21, an exemplary process 500 for controlling or operating the pump 4 based on the time value determined using process 400 is shown. Operating the pump 4 based on the time value, and more specifically providing power to the pump 4 for the duration of the time value after the float switch 6 has opened, can reduce the number of starts of the pump motor and potentially increase the lifetime of the pump 4. A controller included in the power adapter (e.g., the power adapter 34 and/or 300) can be configured to execute the process 500.

At 504, the process 500 can determine the float switch 6 is on. The process 500 can then proceed to 508.

At 508, the process 500 can provide power to the pump 4. The process 500 can then proceed to 512.

At 512, the process 500 can determine whether or not the float switch is off. The process 400 can then proceed to 416.

At 516, if the process 500 determined that the float switch 6 is off (e.g., "YES" at 516), the process 500 can proceed to 520. If the process 500 determined that the float switch 6 is not off (e.g., "NO" at 516), the process 400 can proceed to 518.

At 518, the process 500 can continue supplying power to the pump 4. The process 500 can then proceed to 512.

At 520, the process 500 can continue supplying power to the pump 4 until an amount of time equal to the time value has passed since the determining that the float switch is off at step 516. As mentioned above, the time value can be determined previously using the process 400. In some embodiments, the process 500 can start a countdown timer initialized with the time value at 516 and determine the amount of time equal to the time value has passed when the countdown timer expires. The process 500 can then proceed to 524.

At 524, the process 500 can cease supplying power to the pump 4. The process 500 can then end.

Figure 22:
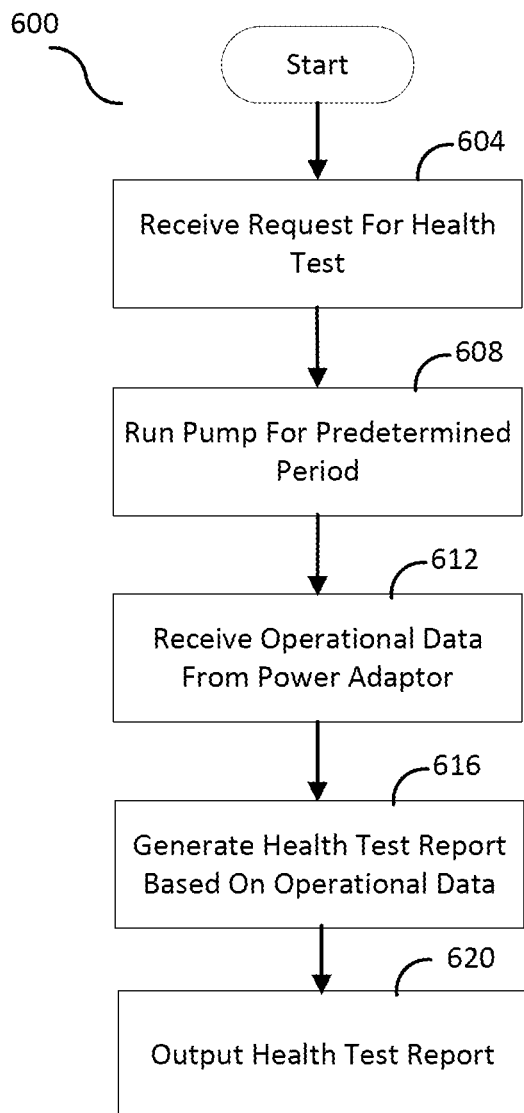
FIG. 22 is an exemplary process for performing health test on a sump pump.

Referring now to FIG. 22, an exemplary process 600 for performing health test on the pump 4 is shown. The results of the test can be provided to the homeowner (e.g., via a smartphone). The health test can be performed on an automated schedule, and/or when the homeowner requests a new health test. In some embodiments, the power adapter (e.g. power adapter 34 and/or 300) can measure operational values such as, but not limited to: instantaneous motor current, peak motor current, cycle time, number of cycles, pump run time, power factor, and/or voltage. From these values, analytics can provide values such as, but not limited to: average weekly motor current, average motor current per cycle, longest cycle length, shortest cycle length, total number of cycles, total pump run time, average power per week, and/or average power per cycle. In some embodiments, a user/homeowner can provide inputs via an internet enabled device (e.g., their smartphone), such as but not limited to: clear fault, default settings, dry run delay time, dry run detection time, dry run enable/disable, excessive run time limit, fault readings, pump control method, pump start/stop, motor service factor amps, pump status, and power. A controller included in the power adapter (e.g., the power adapter 34 and/or 300) can be configured to execute at least a portion of the process 600, while certain steps may be executed by a server and/or user device.

At 604, the process 600 can receive a request for performing the health test from a user or a monitoring process. The monitoring process can be used to monitor the power adaptor and can be run as an automated process on a server located remotely from the power adapter. The monitoring process may regularly (e.g., on a scheduled basis) perform health tests. In some embodiments, the monitoring process can request the health test to be performed at variable intervals. For example, the monitoring process can increase the time between subsequent health tests, i.e. one month between a first health test and a second health test, two months between the second health test and a third health test, etc. The process 600 can then proceed to 608.

At 608, the process can run the pump 4 for a predetermined time period. The time period can be long enough to take sufficient operational data in order to assess how well the pump is running. The operational data can be generated by sensors onboard the power adapter. The process 600 can then proceed to 612.

At 612, the process 600 can receive operational data from the power adapter. The operational data can include average weekly motor current, average motor current per cycle, longest cycle length, shortest cycle length, total number of cycles, total pump run time, average power per week, average power per cycle, power factor, cycles between the last health test, the time of one or more health tests, voltage, and/or other operational parameters measured by the power adapter. The operational data can also include data derived during step 608 such as power factor, current drawn, and/or voltage. The process 600 can then proceed to 616.

At 616, the process 600 can generate a health test report based on the operational data received at 612. The health test report can include one or more graphs or charts indicating the results of the test. Raw data (e.g., unformatted numbers) may be included in the report. In some embodiments, the report can include recommendations to help a user better run the pump 4 and/or maintenance that may need to be performed on the pump. The report can also include dealer information about one or more dealers closest to the location of the user so that the user can obtain parts and/or service for the pump 4. The process 600 can then proceed to 620.

At 620, the process 600 can output the health test report to the user device. The process 600 can then end.

Although the invention is generally directed to a power adapter used in connection with a sump pump system used in a home, this is merely for illustrative purposes, and the power adapter can be used in other contexts. Additionally, although the disclosure is generally directed to a power adapter, one or more aspects of the invention can be in other types of devices that relate to pump control.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any other suitable media that is fleeting and devoid of any semblance of permanence during transmission, and/or any suitable intangible media.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

As used herein and in the appended claims, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

What is claimed is:

1. A system for monitoring operation of a sump pump via a remote server, the system comprising:
    a power adapter, comprising:
        a housing;
        a controller positioned within the housing, the controller establishing connection with the remote server via a first wireless connection to a first wireless network;
        prongs extending away from the housing and in electrical communication with components coupled to the controller, the prongs configured to receive electric power from electric power inputs;
        a first receptacle positioned on the housing and configured to accept a float-switch input and electrically connect the float-switch input to the controller and the electric power inputs; and;
        a second receptacle positioned on the housing and configured to accept a sump pump input of the sump pump and electrically connect the sump pump input to the controller and the electric power inputs.

2. The system of claim 1, wherein the controller is further configured to execute computer-readable instructions to:

determine a power status of a float switch electrically coupled to the power adapter at the first receptacle;
provide power to the sump pump;
sense a current provided to the sump pump;
determine a time value that has elapsed; and
control the pump based on comparing the current and the time value.

3. The system of claim 2, wherein the power status of the float switch is either a float switch on configuration or a float switch off configuration.

4. The system of claim 2, wherein the controller operates the pump based on the time value using a method comprising:
determining that the float switch is on;
providing power to the sump pump;
determining that the float switch is off;
continuing to provide power to the sump pump for an amount of time equal to the time value has passed since the determining that the float switch is off; and
ceasing to provide power to the sump pump.

5. The system of claim 1, wherein the housing comprises a mounting hole oriented to accept a screw for insertion into a duplex wall outlet to affix the power adapter to the duplex outlet.

6. The system of claim 5, further comprising a tab extension configured to be inserted into the mounting hole and a second mounting hole, the second mounting hole configured to accept the screw for insertion into a simplex wall outlet to affix the power adapter to the simplex outlet.

7. The system of claim 1, wherein the power adapter further includes a secondary float switch coupled to high water switch terminals that can detect when a water level reaches a predetermined height and indicate a potential flood condition.

8. The system of claim 1, wherein the second receptacle is provided in the form of a switch receptacle having three terminals.

9. The system of claim 1, wherein the housing includes an input device.

10. The system of claim 9, wherein activation of the input device is designed to initiate a factory reset process, a manual pump operation process, a local mode of the power adapter, or clear a fault.

11. The system of claim 1, wherein the controller performs a health test comprising the steps of:
running the sump pump for a predetermined time period;
receiving operational data from the power adapter;
generating a health test report based on the operational data; and
outputting the health test report to a user device.

12. The system of claim 1, wherein the power adapter further includes an indicator system.

13. The system of claim 12, wherein the indicator system is provided in the form of a first indicator and a second indicator that can be configured to change based on operating conditions of the system.

14. The system of claim 13, wherein the first indicator is positioned between the first receptacle and the second receptacle, and the second indicator is positioned on a top surface of the housing.

15. The system of claim 12, wherein the indicator system is illuminated in a solid red configuration during a locked rotor state, a dry run state, a relay event, and a high water state.

16. The system of claim 15, wherein the indicator system is illuminated in a solid yellow configuration during an over current state, an excessive run time state, a current sensor event where the sump pump is stopped, a float switch event where the sump pump is stopped, and an offline event where the sump pump is stopped.

17. A system for monitoring operation of a float-switch controlled sump pump via a remote server, the system comprising:
a power adapter, comprising:
a housing;
a controller that establishes a first wireless connection to a first wireless network and transmits a message to the remote server over the first wireless network;
prongs extending away from the housing and in electrical communication with components coupled to the controller, the prongs configured to receive electric power from electric power inputs;
a first receptacle configured to accept a float-switch input, the float-switch input in electrical communication with a printed circuit board upon insertion into the first receptacle; and
a second receptacle configured to accept a sump pump input, the sump pump input in electrical communication with the printed circuit board upon insertion into the second receptacle.

18. The system of claim 17, wherein the controller is further configured to:
determine that the float switch is on;
provide power to the sump pump;
determine that the float switch is off;
continue to provide power to the sump pump for an amount of time equal to a predetermined time value has passed since the determining that the float switch is off; and
cease to provide power to the sump pump.

19. The system of claim 17, wherein the power adapter communicates directly with a user device over a Bluetooth or a WiFi connection.

20. The system of claim 17, wherein the message comprises at least one of an average weekly motor current, an average motor current per cycle, a longest cycle length, a shortest cycle length, a total number of cycles, a total pump run time, an average power per week, an average power per cycle, a power factor, a number of cycles between a previous health test, a time of one or more health tests, and a voltage measured by the power adapter.

* * * * *